United States Patent
Tory et al.

(10) Patent No.: US 11,314,817 B1
(45) Date of Patent: Apr. 26, 2022

(54) METHODS AND SYSTEMS FOR INFERRING INTENT AND UTILIZING CONTEXT FOR NATURAL LANGUAGE EXPRESSIONS TO MODIFY DATA VISUALIZATIONS IN A DATA VISUALIZATION INTERFACE

(71) Applicant: Tableau Software, LLC., Seattle, WA (US)

(72) Inventors: Melanie K. Tory, Palo Alto, CA (US); Vidya Raghavan Setlur, Portola Valley, CA (US); Alex Djalali, Athens, GA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 16/575,354

(22) Filed: Sep. 18, 2019

Related U.S. Application Data

(60) Provisional application No. 62/827,768, filed on Apr. 1, 2019.

(51) Int. Cl.
| | |
|---|---|
| *G06F 17/00* | (2019.01) |
| *G06F 16/904* | (2019.01) |
| *G06F 3/04847* | (2022.01) |
| *G06T 11/20* | (2006.01) |
| *G06F 3/16* | (2006.01) |
| *G06F 16/9032* | (2019.01) |

(52) U.S. Cl.
CPC ........ *G06F 16/904* (2019.01); *G06F 3/04847* (2013.01); *G06F 3/167* (2013.01); *G06F 16/90332* (2019.01); *G06T 11/206* (2013.01)

(58) Field of Classification Search
None
See application file for complete search history.

(56) References Cited

U.S. PATENT DOCUMENTS

| | | |
|---|---|---|
| 4,800,810 A | 1/1989 | Masumoto |
| 5,036,314 A | 7/1991 | Barillari et al. |
| 5,060,980 A | 10/1991 | Johnson et al. |

(Continued)

FOREIGN PATENT DOCUMENTS

| | | |
|---|---|---|
| HU | 215657 B | 1/1994 |
| WO | WO 2006/060773 A2 | 6/2006 |

OTHER PUBLICATIONS

Becker, Trellis Graphics Displays: A Multi-dimensional Data Visualization Tool for Data Mining, Aug. 1997, 13 pgs.

(Continued)

*Primary Examiner* — Mustafa A Amin
(74) *Attorney, Agent, or Firm* — Morgan, Lewis & Bockius LLP

(57) ABSTRACT

A method modifies data visualizations based on user selected data sources and user input that specifies natural language commands requesting information from the data sources. The computer displays an initial data visualization according to a visual specification that specifies a plurality of visual variables. The computer determines one or more keywords from the natural language command and determines, based on the one or more keywords, a user intent to modify the data visualization. The computer modifies the plurality of visual variables based on the first user intent and displays a modified data visualization in accordance with the modified plurality of visual variables.

20 Claims, 19 Drawing Sheets

(56) References Cited

U.S. PATENT DOCUMENTS

| | | |
|---|---|---|
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,864,856 A | 1/1999 | Young |
| 5,893,088 A | 4/1999 | Hendricks et al. |
| 5,913,205 A | 6/1999 | Jain et al. |
| 5,933,830 A | 8/1999 | Williams |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 | 4/2001 | Sacerdoti et al. |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B1 | 4/2002 | Tenev et al. |
| 6,397,195 B1 | 5/2002 | Pinard et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,522,342 B1 | 2/2003 | Gagnon et al. |
| 6,611,825 B1 | 8/2003 | Billheimer et al. |
| 6,643,646 B2 | 11/2003 | Su et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,768,986 B2 | 7/2004 | Cras et al. |
| 6,906,717 B2 | 6/2005 | Couckuyt et al. |
| 7,009,609 B2 | 3/2006 | Miyadai |
| 7,023,453 B2 | 4/2006 | Wilkinson |
| 7,089,266 B2 | 8/2006 | Stolte et al. |
| 7,117,058 B2 | 10/2006 | Lin et al. |
| 7,176,924 B2 | 2/2007 | Wilkinson |
| 7,290,007 B2 | 10/2007 | Farber et al. |
| 7,302,383 B2 | 11/2007 | Valles |
| 7,315,305 B2 | 1/2008 | Crotty et al. |
| 7,379,601 B2 | 5/2008 | Yang et al. |
| 7,426,520 B2 | 9/2008 | Gorelik et al. |
| 7,603,267 B2 | 10/2009 | Wang et al. |
| 7,716,173 B2 | 5/2010 | Stolte et al. |
| 7,882,144 B1 | 2/2011 | Stolte et al. |
| 8,082,243 B2 | 12/2011 | Gorelik et al. |
| 8,140,586 B2 | 3/2012 | Stolte et al. |
| 8,442,999 B2 | 5/2013 | Gorelik et al. |
| 8,473,521 B2 | 6/2013 | Fot et al. |
| 8,620,937 B2 | 12/2013 | Jonas |
| 8,713,072 B2 | 4/2014 | Stotle et al. |
| 8,751,505 B2 | 6/2014 | Carmel et al. |
| 8,874,613 B2 | 10/2014 | Gorelik et al. |
| 8,972,457 B2 | 3/2015 | Stolte et al. |
| 9,183,235 B2 | 11/2015 | Stolte et al. |
| 9,299,173 B2 | 3/2016 | Rope et al. |
| 9,336,253 B2 | 5/2016 | Gorelik et al. |
| 9,501,585 B1 | 11/2016 | Gautam et al. |
| 9,633,091 B2 | 4/2017 | Stolte et al. |
| 9,665,662 B1 | 5/2017 | Gautam et al. |
| 9,818,211 B1 | 11/2017 | Gibb et al. |
| 9,858,292 B1 | 1/2018 | Setlur et al. |
| 9,947,314 B2 | 4/2018 | Cao et al. |
| 9,983,849 B2 | 5/2018 | Weingartner |
| 10,042,517 B2 | 8/2018 | Stolte et al. |
| 10,042,901 B2 | 8/2018 | Stolte et al. |
| 10,331,720 B2 | 6/2019 | Neels et al. |
| 10,418,032 B1 | 9/2019 | Mohajer et al. |
| 10,515,121 B1 | 12/2019 | Setlur et al. |
| 10,546,001 B1 | 1/2020 | Nguyen et al. |
| 10,546,003 B2 | 1/2020 | Gupta et al. |
| 10,564,622 B1 | 2/2020 | Dean et al. |
| 10,817,527 B1 | 10/2020 | Setlur et al. |
| 10,956,655 B2 | 3/2021 | Choe |
| 11,080,336 B2 | 8/2021 | van Dusen |
| 11,114,189 B2 | 9/2021 | Prosky et al. |
| 2001/0013036 A1* | 8/2001 | Judicibus ............ G06F 16/3322 |
| 2002/0002325 A1 | 1/2002 | Lliff |
| 2002/0059204 A1 | 5/2002 | Harris |
| 2002/0118192 A1 | 8/2002 | Couckuyt et al. |
| 2002/0123865 A1 | 9/2002 | Whitney et al. |
| 2002/0135610 A1 | 9/2002 | Ootani et al. |
| 2002/0154118 A1 | 10/2002 | McCarthy et al. |
| 2003/0200034 A1 | 10/2003 | Fellenberg et al. |
| 2004/0148170 A1 | 7/2004 | Acero et al. |
| 2004/0183800 A1 | 9/2004 | Peterson |
| 2004/0227759 A1 | 11/2004 | McKnight et al. |
| 2004/0243593 A1 | 12/2004 | Stolte et al. |
| 2005/0035966 A1 | 2/2005 | Pasquarette et al. |
| 2005/0035967 A1 | 2/2005 | Joffrain et al. |
| 2005/0060300 A1 | 3/2005 | Stolte et al. |
| 2005/0099423 A1 | 5/2005 | Brauss |
| 2006/0129913 A1 | 6/2006 | Vigesaa et al. |
| 2006/0136825 A1 | 6/2006 | Cory et al. |
| 2006/0205512 A1 | 9/2006 | Hanrahan et al. |
| 2007/0061344 A1 | 3/2007 | Dickerman et al. |
| 2007/0061611 A1 | 3/2007 | MacKinlay et al. |
| 2007/0126736 A1* | 6/2007 | Tolle ............... G06T 11/001 |
| | | 345/440 |
| 2007/0129936 A1 | 6/2007 | Wang et al. |
| 2008/0016026 A1 | 1/2008 | Farber et al. |
| 2009/0313576 A1 | 12/2009 | Neumann et al. |
| 2011/0112837 A1 | 5/2011 | Kurki-Sounio et al. |
| 2011/0119047 A1 | 5/2011 | Ylonen |
| 2011/0184718 A1 | 7/2011 | Chen |
| 2012/0323948 A1 | 12/2012 | Li et al. |
| 2013/0249917 A1 | 9/2013 | Fanning et al. |
| 2014/0164362 A1 | 6/2014 | Syed et al. |
| 2014/0236579 A1 | 8/2014 | Kurz |
| 2016/0078354 A1 | 3/2016 | Petri et al. |
| 2016/0092090 A1 | 3/2016 | Stojanovic et al. |
| 2016/0171050 A1* | 6/2016 | Das ............... G06F 16/90332 |
| | | 707/714 |
| 2016/0179908 A1 | 6/2016 | Johnston et al. |
| 2017/0011023 A1 | 1/2017 | Ghannam et al. |
| 2017/0091277 A1 | 3/2017 | Zoch |
| 2017/0091902 A1 | 3/2017 | Bostik et al. |
| 2017/0118308 A1* | 4/2017 | Vigeant ............ H04N 7/15 |
| 2017/0154089 A1* | 6/2017 | Sherman ............ G06F 16/26 |
| 2017/0308571 A1* | 10/2017 | McCurley ............ G06F 16/243 |
| 2018/0032576 A1 | 2/2018 | Romero |
| 2018/0039614 A1 | 2/2018 | Govindarajulu et al. |
| 2018/0144065 A1 | 5/2018 | Yellai |
| 2018/0158245 A1 | 6/2018 | Govindan |
| 2018/0203924 A1 | 7/2018 | Agrawal et al. |
| 2018/0210883 A1 | 7/2018 | Ang |
| 2018/0329987 A1 | 11/2018 | Tata et al. |
| 2019/0042634 A1 | 2/2019 | Stolte et al. |
| 2019/0102390 A1 | 4/2019 | Antunes et al. |
| 2019/0108171 A1 | 4/2019 | Stolte et al. |
| 2019/0115016 A1 | 4/2019 | Seok et al. |
| 2019/0120649 A1 | 4/2019 | Seok et al. |
| 2019/0121801 A1 | 4/2019 | Jethwa et al. |

(56) References Cited

U.S. PATENT DOCUMENTS

| | | | |
|---|---|---|---|
| 2019/0138648 | A1 | 5/2019 | Gupta et al. |
| 2019/0163807 | A1 | 5/2019 | Jain et al. |
| 2019/0179607 | A1 | 6/2019 | Thangarathnam et al. |
| 2019/0197605 | A1 | 6/2019 | Sadler et al. |
| 2019/0236144 | A1 | 8/2019 | Hou et al. |
| 2019/0272296 | A1 | 9/2019 | Prakash et al. |
| 2019/0311717 | A1 | 10/2019 | Kim et al. |
| 2019/0349321 | A1 | 11/2019 | Cai et al. |
| 2019/0384815 | A1 | 12/2019 | Patel et al. |
| 2020/0065385 | A1 | 2/2020 | Dreher et al. |
| 2020/0089700 | A1 | 3/2020 | Ericson et al. |
| 2020/0089760 | A1 | 3/2020 | Ericson et al. |
| 2020/0090189 | A1 | 3/2020 | Tutuk et al. |
| 2020/0104402 | A1 | 4/2020 | Burnett et al. |
| 2020/0110803 | A1 | 4/2020 | Djalali et al. |
| 2020/0134103 | A1 | 4/2020 | Mankovskii |
| 2020/0327432 | A1 | 10/2020 | Doebelin et al. |

OTHER PUBLICATIONS

Becker, Visualizing Decision Table Classifiers, 1998, 4 pgs.
Beers, Office Action, U.S. Appl. No. 11/787,761, dated Jun. 12, 2008, 12 pgs.
Beers, Office Action, U.S. Appl. No. 11/787,761, dated Dec. 17, 2008, 13 pgs.
Bosch, Performance Analysis and Visualization of Parallel Systems Using SimOS and Rivet: A Case Study , Jan. 2000, 13 pgs.
Bosch, Rivet: A Flexible Environment for Computer Systems Visualization, Feb. 2000, 9 pgs.
Brunk, MineSet: An Integrated System for Data Mining, 1997, 4 pgs.
Derthick, An Interactive Visual Query Environment for Exploring Data, 1997, 11 pgs.
Freeze, Unlocking OLAP with Microsoft SQL Server and Excel 2000, 2000, 220 pgs.
Fua, "Hierarchical Parallel Coordinates for Exploration of Large Datasets," IEEE 1999, pp. 43-50 (Year: 1999).
Eser Kandogan, "Star Coordinates: A Multi-dimensional Visualization Technique with Uniform Treatment of Dimensions," www.citeseerx.st.psu.edu, pp. 1-4, 2000 (YearL 2000).
Fua, Navigating Hierarchies with Structure-Based Brushes, 1999, 7 pgs.
Gao, Tong, et al. "Datatone: Managing ambiguity in natural language interfaces for data visualization." Proceedings of the 28th Annual ACM Symposium on User Interface Software & Technology. Nov. 2015, pp. 489-500. (Year: 2015).
Goldstein, A Framework for Knowledge-Based Interactive Data Exploration, Dec. 1994, 30 pgs.
Gray, Data Cube: A Relational Aggregation Operator Generalizing Group-By, 1997, 24 pgs.
Hanrahan, Office Action, U.S. Appl. No. 11/005,652, dated Feb. 20, 2009, 11 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, dated Dec. 2, 2004, 104 pgs.
Healey, On the Use of Perceptual Cues and Data Mining for Effective Visualization of Scientific Datasets, 1998, 8 pgs.
Hearst, Office Action, U.S. Appl. No. 16/601,413, dated Nov. 3, 2020, 17 pgs.
HU Search Report, HU P0700460, dated Oct. 9, 2007, 1 pg.
John V. Carlis and Joseph A. Konstan, Interactive Visulaization of Serial Periodic Data, www. Courses.ischool.berkeley.edu, pp. 1-10, 1998 (Year: 1998).
Joseph, Office Action, U.S. Appl. No. 13/734,694, dated Aug. 18, 2014, 46 pgs.
Keim, VisDB: Datatbase Exploration Using Multidimensional Visualization, Aug. 1994, 27 pgs.
Kohavi, Data Mining and Visualization, 2000, 8 pgs.
Livney, M. et al., "DEVise: Integraed Querying and Visual Exploration of Large Datasets," ACM, 1997, pp. 301-312, (Year: 1997).
MacDonald, Creating Basic Charts, 2006, 46 pgs.
MacKinlay, Automating the Design of Graphical Presentations of Relational Information, 1986, 34 pgs.
MacKinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Specification, U.S. Appl. No. 11/223,658, dated Sep. 9, 2005, 58 pgs.
Matsushita, Mitsunori, Eisaku Maeda, and Tsuneaki Kato. "An interactive visualization method of numerical data based on natural language requirements." International journal of human-computer studies 60.4, Apr. 2004, pp. 469-488. (Year: 2004).
Perlin, An Alternative Approach to the Computer Interface, 1993, 11 pgs.
Popescu, et al. "Towards a theory of natural language interfaces to databases." Proceedings of the 8th international conference on Intelligent user interfaces. Jan. 2003, pp. 149-157. (Year: 2003).
Rao, The Table Lens: Merging Graphical and Symbolic Representation in an Interactive Focus+Context Visualization for Tabular Information, Apr. 1994, 7 pgs.
Roth, Interactive Graphic Design Using Automatic Presentation Knowledge, Apr. 24-28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-36, 2003, pp. 1-19.
Setlur, Preinterview First Office Action, U.S. Appl. No. 16/234,470, dated Sep. 24, 2020, 6 pgs.
Setlur, First Action Interview Office Action, U.S. Appl. No. 16/234,470, dated Oct. 28, 2020, 4 pgs.
Spenke, Focus: The Interactive Table for Product Comparison and Selection, Nov. 1996, 10 pgs.
Stevens, On the Theory of Scales of Measurement, Jun. 7, 1946, 4 pgs.
Stolte, Multiscale Visualization Using Data Cubes, 2002, 8 pgs.
Stolte, Notice of Allowance, U.S. Appl. No. 10/453,834, dated May 27, 2006, 9 pgs.
Stolte, Notice of Allowance, U.S. Appl. No. 11/488,407, dated Dec. 29, 1999, 8 pgs.
Stolte, Notice of Allowance, U.S. Appl. No. 13/019,227, dated Nov. 10, 2011, 8 pgs.
Stolte, Notice of Allowance, U.S. Appl. No. 13/425,300, dated Dec. 10, 2013, 10 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 13/019,227, dated Apr. 18, 2011, 9 pgs.
Stolte, Office Action, U.S. Appl. No. 13/425,300, dated Mar. 15, 2013, 7 pgs.
Stolte, Office Action, U.S. Appl. No. 14/937,836, dated Oct. 7, 2016, 10 pgs.
Stolte, Notice of Allowance, U.S. Appl. No. 14/937,836, dated Mar. 1, 2017, 8 pgs.
Stolte, Office Action, U.S. Appl. No. 15/449,844, dated Jun. 29, 2017, 16 pgs.
Stolte, Final Office Action, U.S. Appl. No. 15/449,844, dated Feb. 6, 2018, 8 pgs.

(56) References Cited

OTHER PUBLICATIONS

Stolte, Notice of Allowance, U.S. Appl. No. 15/449,844, dated May 18, 2018, 9 pgs.
Stolte, Office Action, U.S. Appl. No. 15/582,478, dated Jul. 11, 2017, 16 pgs.
Stolte, Final Office Action, U.S. Appl. No. 15/582,478, dated Mar. 8, 2018, 10 pgs.
Stolte, Notice of Allowance U.S. Appl. No. 15/582,478, dated Jun. 26, 2017, 10 pgs.
Stolte, Notice of Allowance U.S. Appl. No. 16/056,396, dated Apr. 16, 2019, 10 pgs.
Stolte, Office Action, U.S. Appl. No. 16/056,819, dated Aug. 7, 2019, 12 pgs.
Stolte, Notice of Allowance, U.S. Appl. No. 16/056,819, dated Sep. 11, 2019, 8 pgs.
Stolte Office Action, U.S. Appl. No. 16/220,240, dated Aug. 7, 2019, 11 pgs.
Stolte, Notice of Allowance, U.S. Appl. No. 16/220,240, dated Sep. 11, 2019, 8 pgs.
Stolte Notice of Allowance, U.S. Appl. No. 16/137,457, dated Sep. 6, 2019, 10 pgs.
Stolte Notice of Allowance, U.S. Appl. No. 16/13 7,071, dated Sep. 11, 2019, 10 pgs.
Stolte, Polaris: A System for Query, Analysis, and Visualization of Multidimensional Relational Databases, Jan. 2002, 14 pgs.
Stolte, Query Analysis, and Visualization of Hierarchically Structured Data Using Polaris, Jul. 2002, 11 pgs.
Stolte, Specification, U.S. Appl. No. 10/453,834, Jun. 2, 2003, 114 pgs.
Stolte, Visualizing Application Behavior on Superscaler Processors, 1999, 9 pgs.
Tableau Software, IPRP, PCT/US2005/043937, Jun. 5, 2007, 9 pgs.
Tableau Software, IPRP, PCT/US2007/009810, Oct. 22, 2008, 7 pgs.
Tableau Software, ISR/WO, PCT/US2005/043937, Apr. 18, 2007, 9 pgs.
Tableau Software, ISR/WO, PCT/US2006/35300, Jul. 7, 2008, 6 pgs.
Tableau Software, ISR/WO, PCT/US2007/009810, Jul. 7, 2008, 8 pgs.
Tableau Software, Inc., International Search Report and Written Opinion, PCT/US2019/055169, dated Dec. 16, 2019, 12 pgs.
The Board of Trustees . . . Stanford, IPRP, PCT/US04/18217, Oct. 19, 2006, 4 pgs.
The Board of Trustees . . . Stanford, IPRP, PCT/US2004/30396, Jan 30, 2007, 3 pgs.
The Board of Trustees . . . Stanford, ISR/WO, PCT/US04/18217, Feb. 7, 2006, 6 pgs.
The Board of Trustees . . . Stanford, ISR/WO, PCT/US2004/30396, Aug. 24, 2006, 5 pgs.
The Board of Trustees . . . Stanford, Supplementary ESR, EP 04754739.3, Dec. 17, 2007, 4 pgs.
Thearling, Visualizing Data Mining Models, 2001, 14 pgs.
Tory, First Action Preinterview Office Action, U.S. Appl. No. 16/219,406, dated Jul. 10, 2020, 7 pgs.
Tory, Notice of Allowance U.S. Appl. No. 16/219,406, dated Sep. 9, 2020, 8 pgs.
Tory, Office Action, U.S. Appl. No. 16/575,354, dated Nov. 3, 2020, 17 pgs.
Tory, Office Action, U.S. Appl. No. 16/575,349, dated Oct. 13, 2020, 15 pgs.
Ward, XmdvTool: Integrating Multiple Methods for Visualizing Multi-Variate Data, 9 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Statistics and Computing—The Grammar of Graphics, 1999, 417 pgs.
Hearst, Notice of Allowance, U.S. Appl. No. 16/601,413, dated Mar. 3, 2021, 10 pgs.
Setlur, Final Office Action, U.S. Appl. No. 16/234,470, dated Jun. 2, 2021, 49 pgs.
Tory, Office Action, U.S. Appl. No. 16/575,349, dated Feb. 3, 2021, 9 pgs.
Setlur, Notice of Allowance, U.S. Appl. No. 16/234,470, dated Nov. 10, 2021, 14 pgs.

* cited by examiner

METHODS AND SYSTEMS FOR INFERRING INTENT AND UTILIZING CONTEXT FOR NATURAL LANGUAGE EXPRESSIONS TO MODIFY DATA VISUALIZATIONS IN A DATA VISUALIZATION INTERFACE

RELATED APPLICATIONS

This application claims priority to U.S. Provisional Application Ser. No. 62/827,768, filed Apr. 1, 2019, entitled "Inferring Intent and Utilizing Context for Natural Language Expressions in a Data Visualization User Interface," which is incorporated by reference herein in its entirety.

This application is related to U.S. patent application Ser. No. 16/219,406, filed Dec. 13, 2018, entitled "Identifying Intent in Visual Analytical Conversations," which is incorporated by reference herein in its entirety.

This application is related to U.S. patent application Ser. No. 16/575,349, filed Sep. 18, 2019, entitled "Methods and Systems for Inferring Intent and Utilizing Context For Natural Language Expressions To Generate Data Visualizations in a Data Visualization Interface," which is incorporated by reference herein in its entirety.

TECHNICAL FIELD

The disclosed implementations relate generally to data visualization and more specifically to systems, methods, and user interfaces that enable users to interact with and explore datasets using a natural language interface.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

Natural language has garnered interest as a useful modality for creating and interacting with visualizations. Natural language interaction techniques offer the promise of easy, intuitive engagement with data even for non-experts by enabling users to express their analytical goals as natural language utterances. Natural language interaction is effective when it supports questions pertaining to a user's information needs. In this respect, however, many natural language interfaces fail to accurately determine a user's information needs.

SUMMARY

To effectively support visual analytical workflows, it is critical to accurately infer the user's intent. However, existing natural language interfaces either do not infer intent, infer very limited aspects of intent, rely on explicitly named data attributes, values, and chart types, or restrict relevance of the automatically generated visualization responses.

Accordingly, there is a need for tools that infer user intent to produce more useful visualizations. There is also a need for tools that employ intent to allow users to effectively utilize functionality provided by data visualization applications. One solution to the problem is providing a natural language interface as part of a data visualization application (e.g., within the user interface for the data visualization application) for an interactive dialog that provides graphical results to natural language input. The natural language interface uses both context and intent to support analytical flow in conversations. The natural language interface models transitions in visual analytical conversations by characterizing users' goals.

In accordance with some implementations, a method executes at an electronic device with a display, one or more processors, and memory. For example, the electronic device can be a smart phone, a tablet, a notebook computer, or a desktop computer. The device receives user selection of a data source and a first natural language command, from the user, requesting information related to the data source. The device determines one or more first keywords from the first natural language command and determines, based on the one or more keywords, a first user intent to generate a data visualization. The device then generates a visual specification based on the first user intent. The visual specification specifies the data source (e.g., the user selected data source), a plurality of visual variables, and a plurality of data fields from the data source. Each of the visual variables is associated with a respective one or more of the data fields and each of the data fields is identified as either a dimension or a measure. The device then generates a data visualization based on the generated visual specification and displays the data visualization to the user.

In some implementations, the first user intent includes any of: determining an explicit user intent based on the one or more first keywords, determining a first context based on the plurality of data fields from the data source, and determining an implicit user intent based on the one or more first keywords and the first context.

In some implementations, when an explicit user intent and an implicit user intent are determined, the explicit user intent is prioritized over the implicit user intent.

In some implementations, the device displays a transcription of the first natural language command in an editable field in a user interface in response to receiving the first natural language command. The device may also receive user input to edit the transcription. In such cases, the one or more first keywords are determined based on the edited transcription of the first natural language command.

In some implementations, the device also receives user input to adjust one or more interactive filter controls and interactive legends in a user interface. In response to receiving the user input, the device modifies the plurality of visual variables based on the user input and displays a modified data visualization based on the modified plurality of visual variables.

In some implementations, the device also determines a data visualization type based on the first user intent and generates the data visualization in accordance with the determined data visualization type. In some implementations, the data visualization types include bar charts, line charts, scatterplots, pie charts, heatmaps, text tables, and maps.

In some implementations, the device also receives a second natural language command. In response to receiving the second natural language command, the device determines: (i) one or more second keywords from the second natural language command, (ii) a second user intent based on the one or more second keywords, and (iii) a second context based on the first natural language command and/or the data visualization. The device also modifies the data visualization based on the second user intent and the second context, and displays the modified data visualization.

In some implementations, the first natural language command includes verbal user input (e.g., captured by a microphone).

In some implementations, the first natural language command includes a user utterance.

In some implementations, the first natural language command includes user input of text into a natural language input field.

In accordance with some implementations, a method executes at an electronic device with a display, one or more processors, and memory. For example, the electronic device can be a smart phone, a tablet, a notebook computer, or a desktop computer. The device displays an initial data visualization according to a visual specification that specifies a data source, a plurality of visual variables, and a plurality of data fields from the data source. Each of the visual variables is associated with a respective one or more of the data fields and each of the data fields is identified as either a dimension or a measure. The device receives a user specified first natural language command requesting information related to the data source. The device extracts one or more first keywords from the first natural language command and determines a first user intent to modify the initial data visualization based on the one or more first keywords. The device then modifies the plurality of visual variables in the visual specification based on the first user intent and displays a modified data visualization to the user. The modified data visualization is based on the modified plurality of visual variables.

In some implementations, the first user intent includes any of: determining an explicit user intent based on the one or more first keywords, determining a first context based on the initial data visualization, and determining an implicit user intent based on the one or more first keywords and the first context.

In some implementations, when an explicit user intent and an implicit user intent are determined, the explicit user intent is prioritized over the implicit user intent.

In some implementations, the device also determines a data visualization type based on the first user intent and the data visualization is modified in accordance with the determined data visualization type.

In some implementations, the device displays a transcription of the first natural language command in an editable field in a user interface in response to receiving the first natural language command. The device may also receive a user input to edit the transcription. In such cases, the one or more first keywords are determined based on the edited transcription of the first natural language command.

In some implementations, the device also receives user input to adjust one or more interactive filter controls and interactive legends in a user interface. In response to receiving the user input, the device updates the modified plurality of visual variables based on the user input and displays a an updated data visualization based on the updated plurality of visual variables.

In some implementations, the device also receives a second natural language command that includes a request for information regarding the data source or a request to change the modified data visualization. In response to receiving the second natural language command, the device determines: (i) one or more second keywords from the second natural language command, (ii) a second user intent to change the modified data visualization based on the one or more second keywords, and (iii) a second context based the modified data visualization and/or the first natural language command. The device also updates the data visualization based on the second user intent and the second context, and displays the updated data visualization.

In some implementations, the first natural language command includes a verbal user input.

In some implementations, the first natural language command includes a user utterance.

In some implementations, the first natural language command includes a user input of text into a natural language input field.

Typically, an electronic device includes one or more processors, memory, a display, and one or more programs stored in the memory. The programs are configured for execution by the one or more processors and are configured to perform any of the methods described herein.

In some implementations, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow users to efficiently generate and modify data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
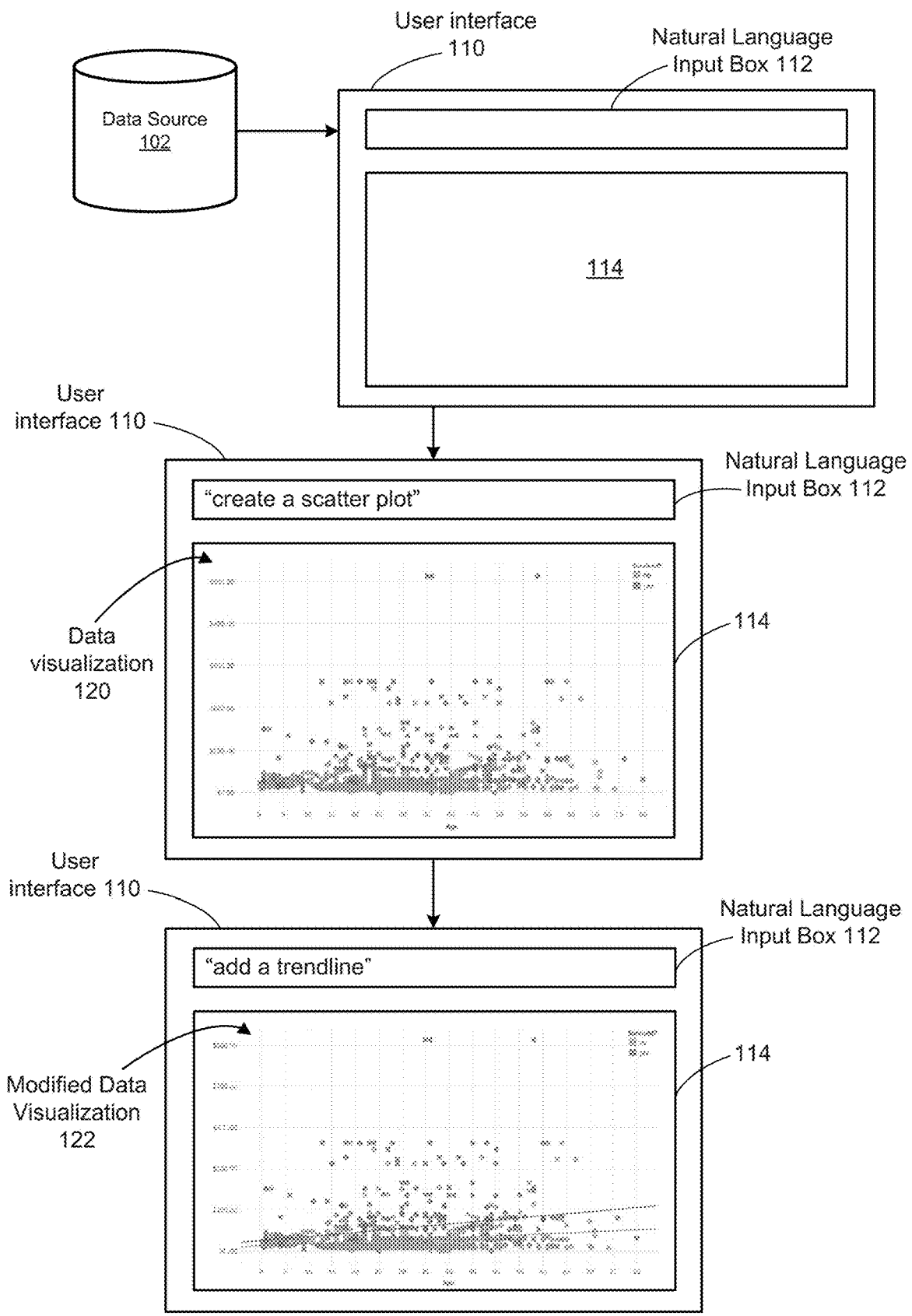
FIG. 1 illustrates generating and modifying a data visualization based on natural language commands, in accordance with some implementations.

FIG. 1 illustrates generating and modifying a data visualization based on natural language commands. Some implementations of an interactive data visualization application include a user interface 110 that includes a natural language input box 112 and a data visualization region 114 for displaying data visualization, as shown in FIG. 1. A data source 102 that is used by the interactive data visualization application to generate data visualizations may be stored locally (e.g., on the same device that is displaying the user interface) or may be stored externally (e.g., on a database server or in the cloud). A data source 102 may be stored in a database or stored as one or more files (e.g., .CSV files) in a file system.

Some implementations of an interactive data visualization application can provide data visualizations based on a natural language command input by a user. The natural language command can include any form of user input that can be understood and translated or transcribed. For instance, the natural language command may include verbal input, a user utterance, a text input, a symbolic input or even a user gesture. In most instances, the natural language command includes a request for information regarding the data source. For example, the natural language command may include a request to plot data included in the data source, or alternatively, may ask a question based on the data in the data source. For example, the data visualization application may receive a first natural language command to "create a scatter plot." In some instances, in response to receiving the first natural language command, the first natural language command is displayed in the natural language input box 112 and a data visualization 120 is displayed in the data visualization region 114 of the user interface 110. In addition to generating a data visualization based on the data source and a natural language command received from a user, the data visualization application may also receive a natural language command to modify a current data visualization. For example, as shown in FIG. 1, subsequent to displaying the data visualization 120 based on the data source and the first natural language command, the data visualization application may receive a second natural language command to "add a trend line." In response to receiving the second natural language command, the natural language input box 112 displays the second natural language command and a modified data visualization 122 is displayed in the data visualization region 114 of the user interface 110. In some instances, described below with respect to FIGS. 3A-3C and 4C-4E, the data visualization application may provide a data visualization in response to a natural language command that includes a question or a request for information about the data source. For example, the natural language command may ask a data source that includes historical records of Olympic medals, "which country won the most gold medals in the last ten years?" or "how many medals were awarded to Canada between the years 2000-2019?" In response to such questions, the data visualization application may display, respectively, a bar chart showing the total number of medals awarded to each country in the last ten years and a line graph showing the number of medals awarded to Canada between the years 2000 and 2019. Further, the data visualization may highlight or emphasize portions of the data visualization in order to better fulfill the user's natural language command. For example, in the bar chart showing the total number of medals awarded to each country in the last ten years, the top country or the top five countries with the highest sum of awarded medals may be highlighted.

In some implementations, the data visualization application is configured to provide responses to natural language commands so that there are no "dead ends." By utilizing the methods described herein, the data visualization application maintains context from either existing data visualizations or from the natural language command in order to provide consistent modifications to the data visualization that are not unexpected for the user (e.g., the system maintains the context of the data prior to the natural language command). Additionally, the data visualization application may use techniques to extract or infer a user's intention based on the natural language command. By using methods that can handle underspecified or vague commands, as well as infer an implicit user intent from the natural language command, the data visualization application can adapt to each natural language command, remain interactive with the user, and allow the user to "undo" or "retry" when the data visualization application provides an unexpected data visualization. This avoids raising error message or not providing a response to an underspecified natural language command (e.g., "dead ends").

Figure 2A:
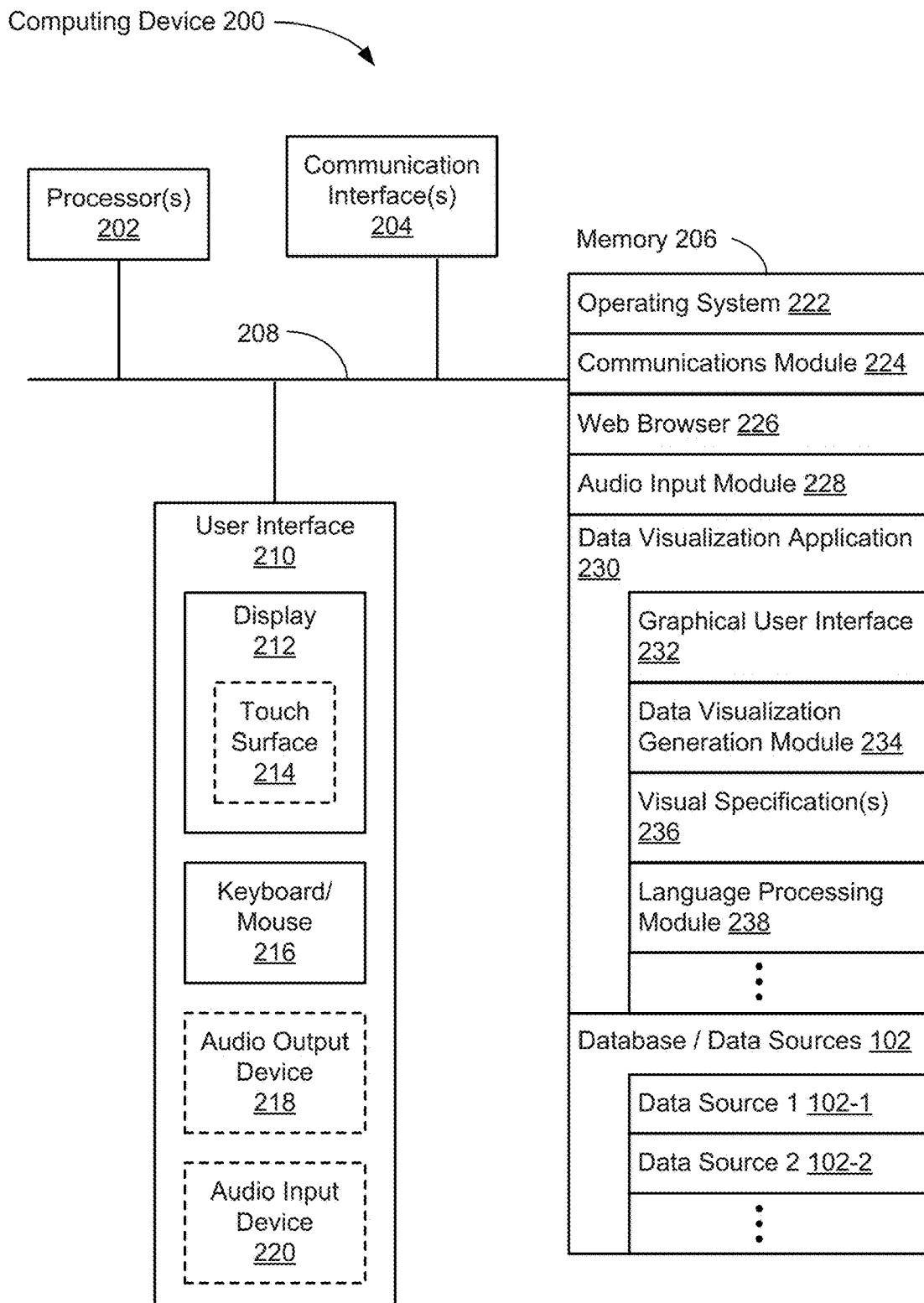
FIG. 2A is a block diagram illustrating a computing device according to some implementations.

FIG. 2A is a block diagram illustrating a computing device 200 that can execute a data visualization application 230 or a data visualization web application to display the graphical user interface 232 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition software to supplement or replace the keyboard. An audio input device 220 (e.g., a microphone) captures audio (e.g., speech from a user).

The memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The application 230 includes a graphical user interface 232 (e.g., the graphical user interface 110 illustrated in FIG. 1) for a user to construct visual graphics. For example, a user selects one or more data sources 102 (which may be stored on the computing device 200 or stored remotely), selects data fields from the data sources, and uses the selected fields to define a visual graphic; and
- zero or more databases or data sources 102 (e.g., a first data source 102-1 and a second data source 102-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the user interface 232. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. In some implementations, a visual specification 236 includes previous natural language commands received from a user or properties specified by the user through natural language commands.

In some implementations, the data visualization application 230 includes a language processing module 238 for processing (e.g., interpreting) commands provided by a user of the computing device. In some implementations, the commands are natural language commands (e.g., captured by the audio input device 220 or input via the touch surface 214 or the one or more input buttons such as buttons on a keyboard/mouse 216). In some implementations, the language processing module 238 includes sub-modules, such as an intent deduction module.

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
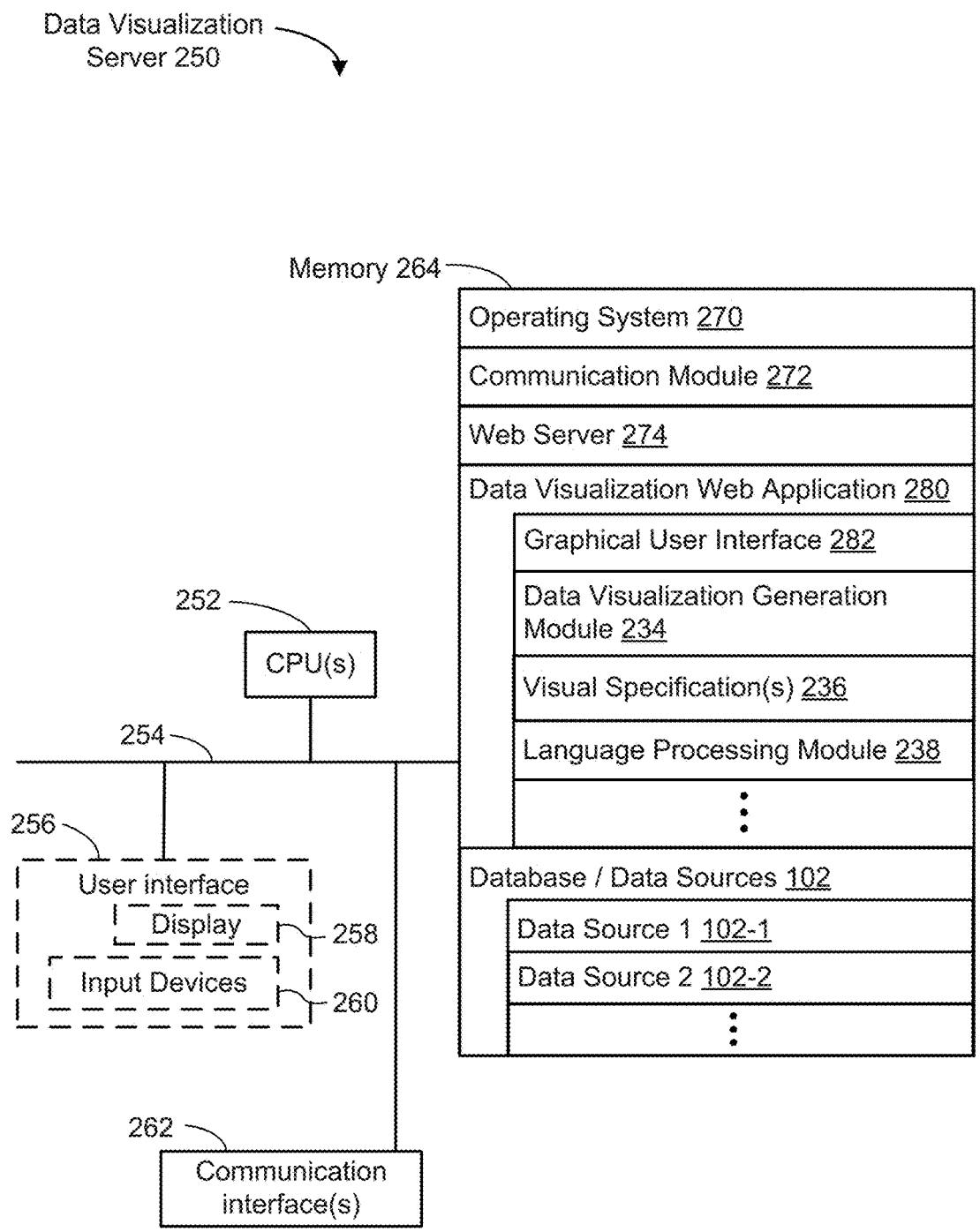
FIG. 2B is a block diagram illustrating a data visualization server according to some implementations.

FIG. 2B is a block diagram illustrating a data visualization server 250 according to some implementations. A data visualization server 250 may host one or more databases that include data sources 102 or may provide various executable applications or modules. A server 250 typically includes one or more processing units/cores (CPUs) 252, one or more network communication interfaces 262, memory 264, and one or more communication buses 254 for interconnecting these components. In some implementations, the server 250 includes a user interface 256, which includes a display 258 and one or more input devices 260, such as a keyboard and a mouse. In some implementations, the communication buses 254 include circuitry (sometimes called a chipset) that interconnects and controls communications between system components.

In some implementations, the memory 264 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 264 includes one or more storage devices remotely located from the CPUs 250. The memory 264, or alternatively the non-volatile memory devices within the memory 264, comprises a non-transitory computer readable storage medium.

In some implementations, the memory 264, or the computer readable storage medium of the memory 264, stores the following programs, modules, and data structures, or a subset thereof:

- an operating system 270, which includes procedures for handling various basic system services and for performing hardware dependent tasks;
- a network communication module 272, which is used for connecting the server 250 to other computers via the one or more communication network interfaces 262 (wired or wireless) and one or more communication networks, such as the Internet, other wide area networks, local area networks, metropolitan area networks, and so on;
- a web server 274 (such as an HTTP server), which receives web requests from users and responds by providing responsive web pages or other resources;
- a data visualization web application 280, which may a web application that is downloaded and executed by a web browser 274 on a user's computing device 200. In general, a data visualization application web has the same functionality as a desktop data visualization application, but provides the flexibility of access from any device at any location with network connectivity, and does not require installation and maintenance. In some implementations, the data visualization web application includes various software modules to perform certain tasks. In some implementations, the data visualization web application includes a graphical user interface 282, which provides the user interface for all aspects of the data visualization application 280; and
- a database that stores zero or more data source 102, as described above for a client device 200.

In some implementations, the data visualization web application 280 includes a data visualization generation module 234 and/or a language processing module 238, as described above for a client device 200. In some implementations, the data visualization web application 280 stores visual specifications 236, which are used to build data visualizations.

Although FIG. 2B shows a data visualization server 250, FIG. 2B is intended more as a functional description of the various features that may be present rather than as a structural schematic of the implementations described herein. In practice, and as recognized by those of ordinary skill in the art, items shown separately could be combined and some items could be separated.

Figure 3A:
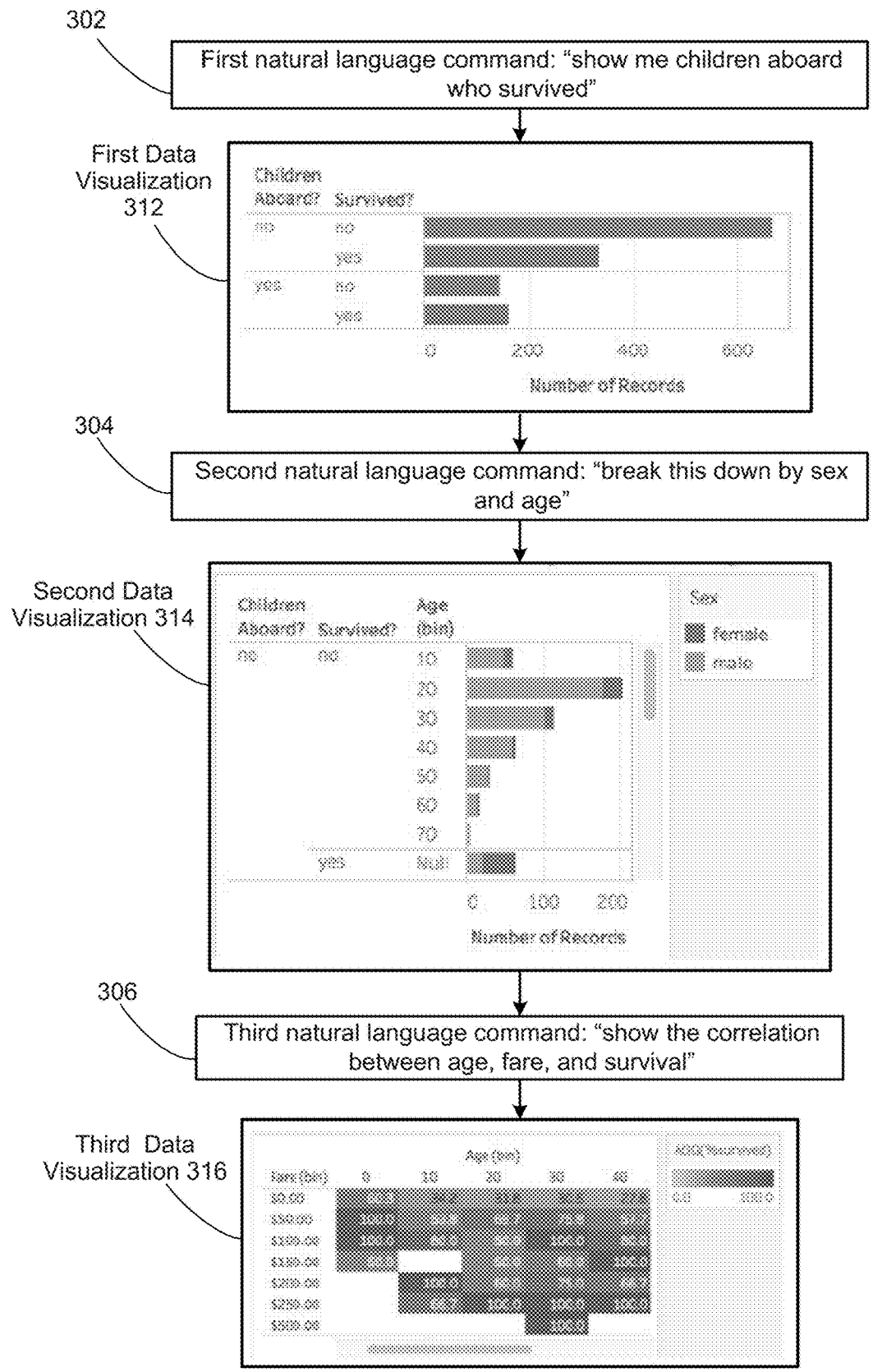
FIGS. 3A-3C illustrate how intent in analytical conversation is used to drive effective visualization responses, according to some implementations.
Figure 3B:
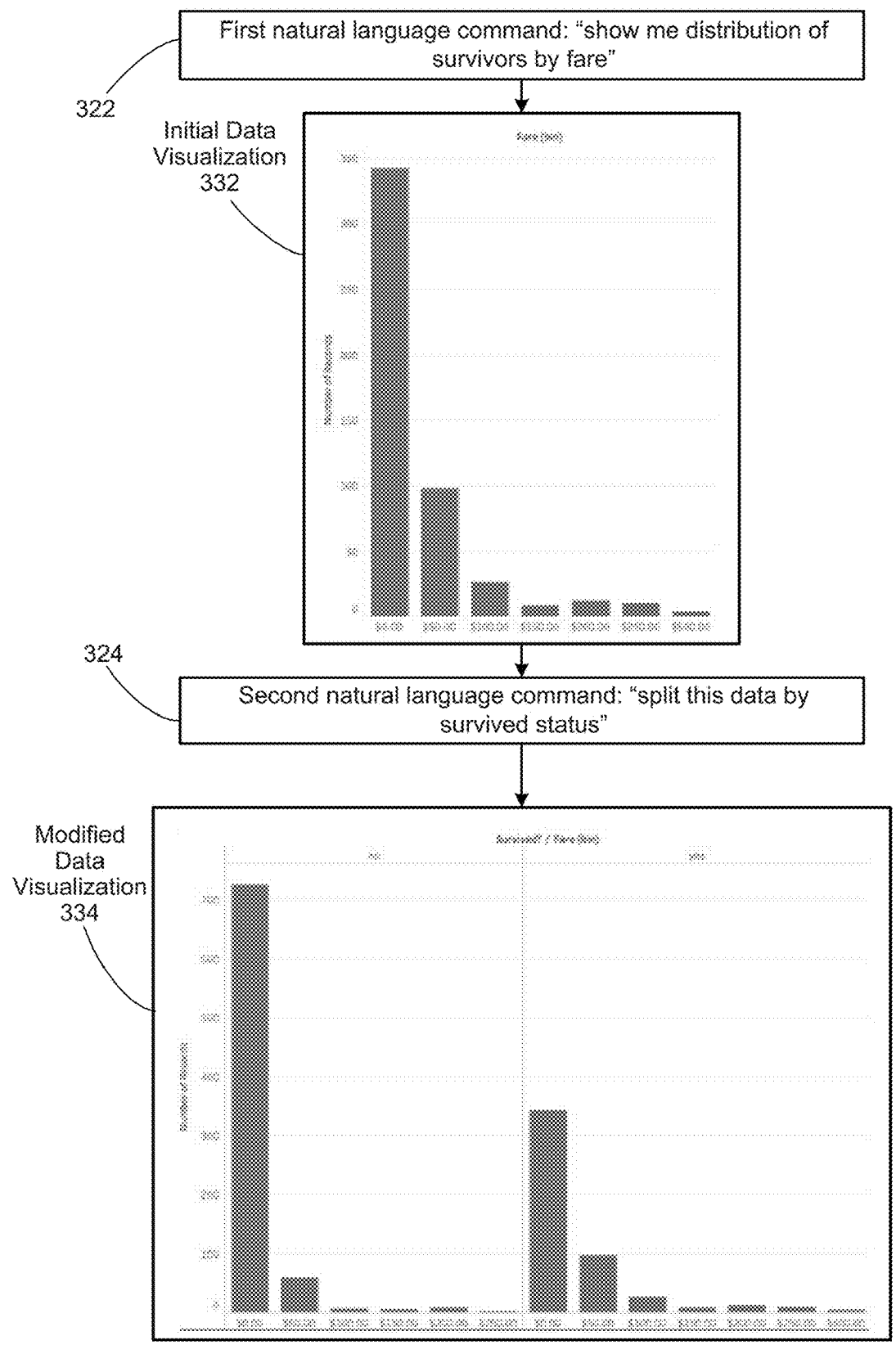
Figure 3C:
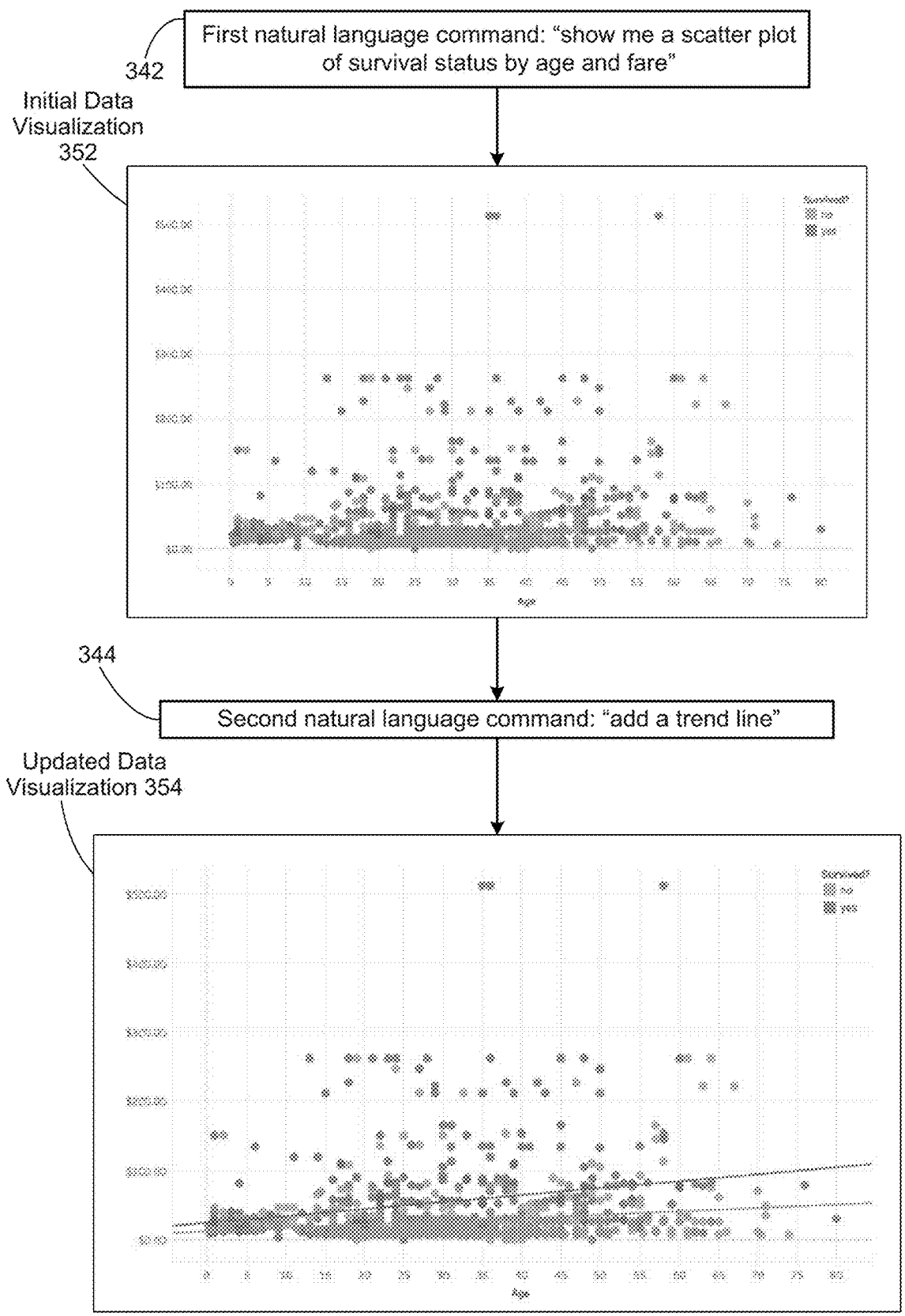

FIG. 3A-3C illustrate how intent in analytical conversation is used to drive effective visualization responses, according to some implementations. The examples shown in FIGS. 3A-3C are related to a data source that has information about passengers on the Titanic.

Referring to FIG. 3A, a user provides a first natural language command 302 ("show me children aboard who survived"). In some implementations, the computing device 200 responds by determining first keywords in the first natural language command 302 and determining user intent based on the first keywords. In this example, the computing device determines the user intent to generate a data visualization that includes the attributes "Age" and "Survived" and the determined first keywords may include, for example, "show," "children," and "survived." The computing device generates a visual specification that specifies the data source, a plurality of visual variables, and a plurality of data fields from the data source. Each of the visual variables is associated with a respective one or more of the data fields and each of the data fields is identified as either a dimension or a measure. For example, "Age" and "Survived" are dimensions, and are associated with the "columns" visible variable. The visual variables determine the visual marks to be displayed in a data visualization. The computing device generates and displays a first data visualization 312 based on the visual specification. In some implementations, as shown, the data visualization includes information regarding children who survived as well as children who did not survive since the context of total number of children aboard or the comparison between children who did versus did not survive may be more interesting or provide more context and relevance to the user.

Note that the generated data visualization has binned the records according to age, such as defining children to be passengers whose ages were <18. The display of children/ not children and survived/not survived is generally more useful than a data visualization that literally displayed only what the user asked (e.g., a single number based on filtering the data to just rows from the data source having Age <18 and Survived=True).

A user may provide a second natural language command 304 ("break this down by sex and age"). In response, the computing device 200 modifies the visual specification based on second keyword(s) determined from the second natural language command 304 and a user intent that is determined based on the second keyword(s). The computing device 200 then provides a second data visualization 314. The second data visualization 314 retains the attributes "Children Aboard?" and "Survived?" from the first data visualization 312, while adding data attributes "Sex" and "Age" in a way that preserves the previous structure of the bar chart in the first data visualization 312 (namely, a stacked bar chart that is further split into age bins).

Further, the user provides a third natural language command 306 ("what's the correlation between age, fare, and survival"), which has an implicit intent of asking for a "correlation." The factors ("age," "fare," and "survival") in the data source suggest a new visualization, such as a heat map, to depict the correlation between the data attributes "survived," "Age," and "Fare." The computing device 200 responds by generating and displaying a third data visualization 314 that is a heat map, according to some implementations.

FIG. 3B shows another example of using the data source that has information about passengers on the Titanic. In response to receiving a first natural language command 322 ("show me distribution of survivors by fare") from a user, the computing device 200 provides an initial data visualization 332. The user may further ask, "split this data by survived status," providing a second natural language command 324. The initial data visualization 332 provides a context of (i) a bar graph and (ii) information regarding the attribute "fare." In response, the computing device 200 provides a modified data visualization 334 that, based on the context provided by the initial data visualization 332, retains the attribute "Fare" from the initial data visualization 322, while adding the data attribute "Survived?" in a way that preserves the previous structure of the bar chart in the initial data visualization 332 (e.g., by splitting the bar chart into two bar charts).

FIG. 3C illustrates an example of the computing device 200 receiving natural language commands that are related to modifying views or adding information to a previously displayed data visualization. For example, a user might say "show me a scatter plot of survival status by age and fare, providing a first natural language command 342. The computing device 200 determines, from the first natural language command 342, the user's intent of generating a data visualization that is a scatter plot data visualization type and generates a visual specification that corresponds with the determined user intent. In response to receiving the first natural language command 342, the computing device 200 displays an initial data visualization 352 that is a scatter plot of passengers according to the attributes "age" and "fare."

In some implementations, a natural language command may include an explicit intent request and/or an implicit intent. An explicit intent clearly states what a user expects to see and is prioritized over other inferences such as implicit intent. For example, if the first natural language command 342 includes "age and fare colored by survival status," the user clearly indicates how the survival status attribute should be encoded. In this example, the an explicit intent is determined by the computing device 200 and is used in generating the visual specification (e.g., the visual specification will dictate that the survival status is encoded by color). Conversely, implicit intents do not directly specify details of a visual specification, but visualization best practices suggest taking implicit intent into consideration when generating the visual specification.

Further, the user may provide a second natural language command 344 ("add a trend line") to modify the currently displayed data visualization 352. In response to receiving the second natural language command 344, the computing device 200 determines the user's intent to modify the existing data visualization by adding a trend line. The computing device 200 updates the visual specification based on the determined user intent and displays an updated data visualization 354 that retains the information and data visualization type of the initial data visualization 352 and adds trend lines that correspond to the displayed data. Note that two trend lines are created even though the user asked for "a trend line." The two distinct trend lines are needed because a separate trend line is needed for each survival status.

Some additional examples of user intent include: elaborate (add new information to the visualization); adjust/pivot (adapt aspects of the visualization, such as apply/remove/ modify a filter, or add/remove data fields); start new (create an altogether new visualization); retry (re-attempt a previous step that "failed"—either for technical reasons, such as a query timeout, or because the previous command failed to convey the desired visualization); and undo (return to the prior state).

Some examples of context include (i) currently selected data source, (ii) currently selected data fields, (iii) current data visualization state or type, (iv) currently applied filters, (v) currently displayed visual marks (including trend lines, highlighting, emphasize/deemphasize), and (vi) current color scheme.

Figure 4A:
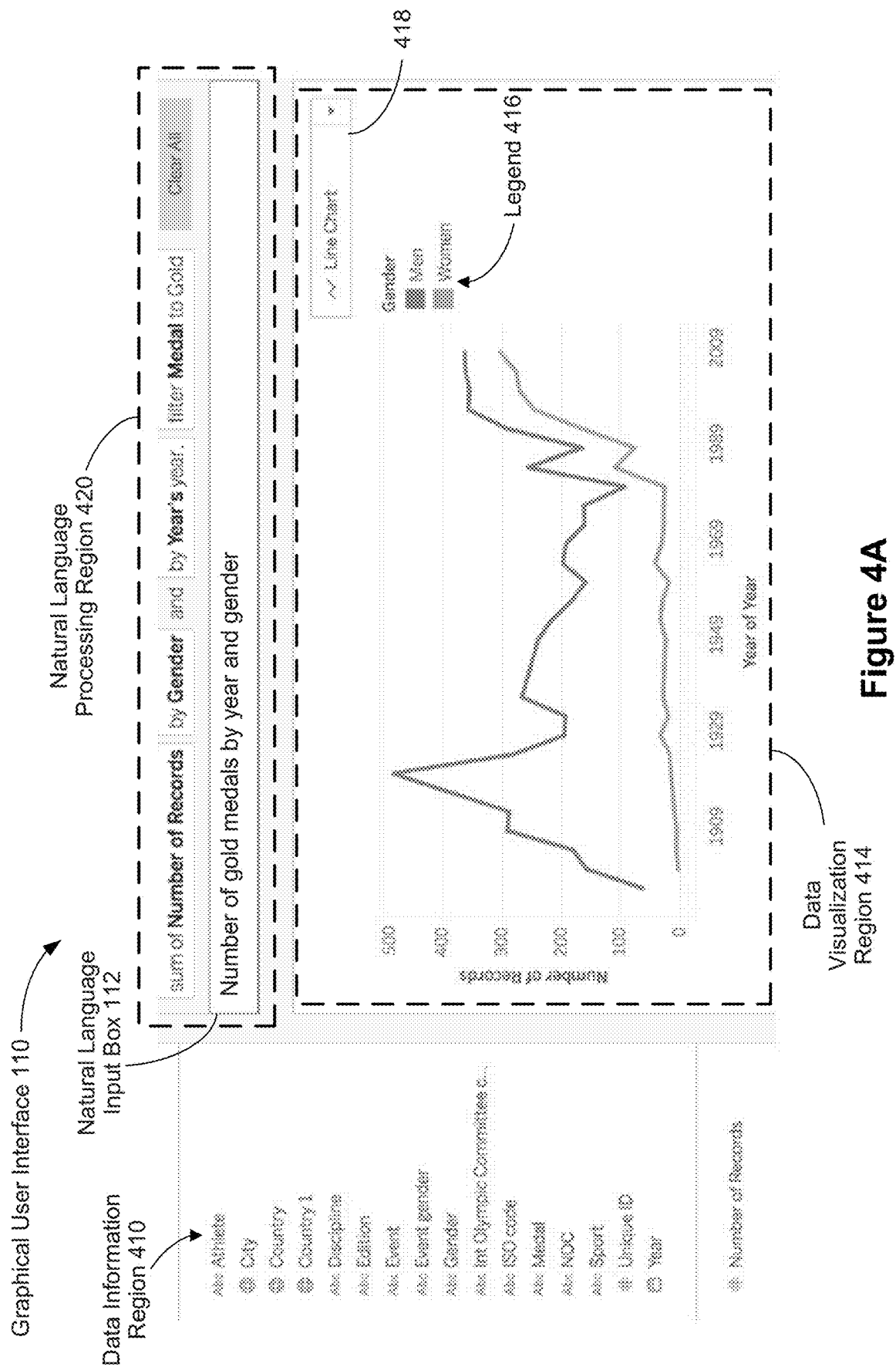
FIGS. 4A and 4B illustrate graphical user interfaces used in some implementations.
Figure 4B:
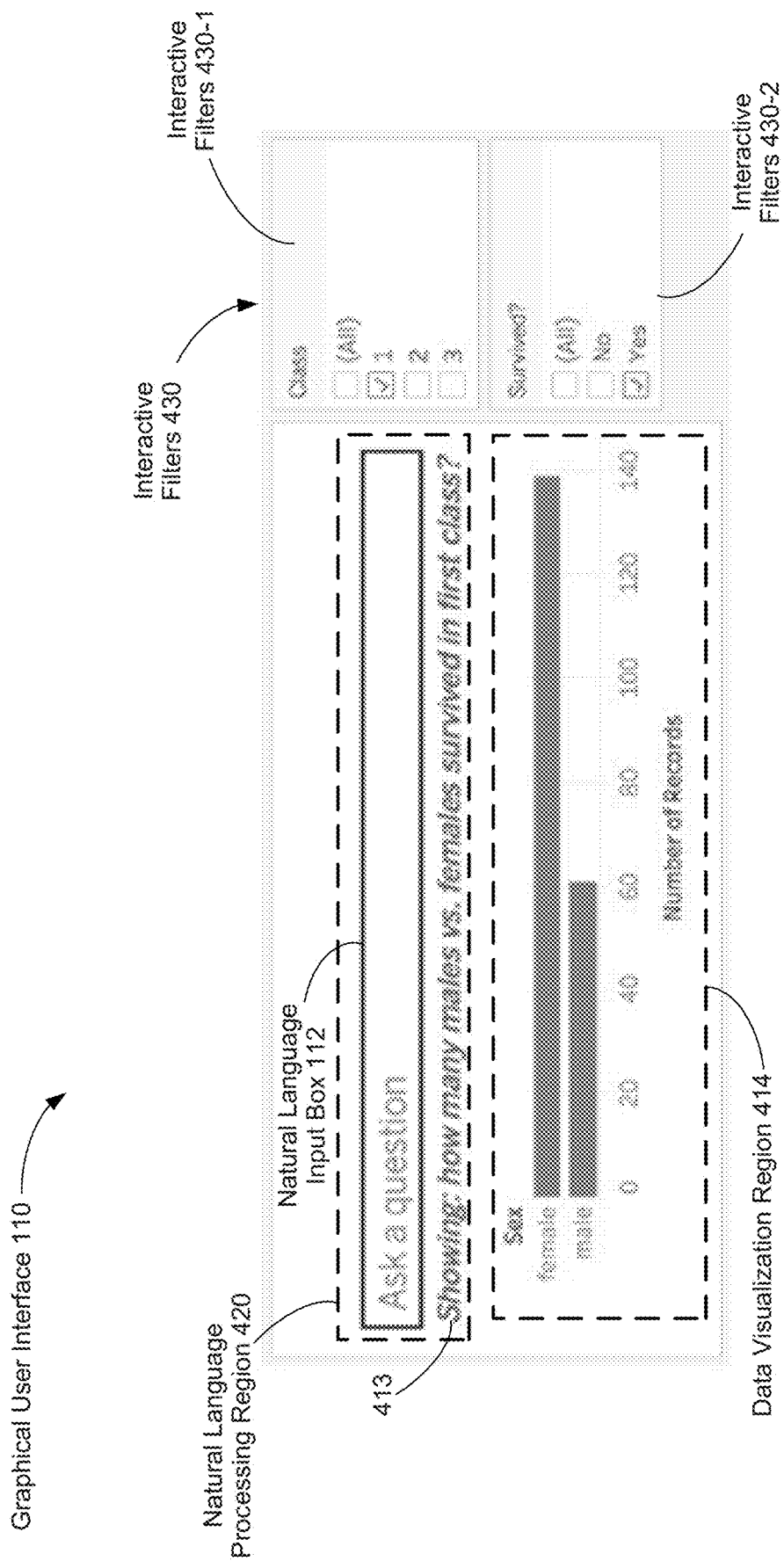

FIGS. 4A and 4B illustrate a graphical user interface 110 for interactive data analysis in accordance with some implementations. The graphical user interface 110 includes a data information region 410, which provides named data elements (e.g., field names) that may be selected and used in a data visualization (e.g., used to generate or build a data visualization, used to modify a data visualization, or included in a data visualization). In some implementations, the list of field names is separated into a group of dimensions (e.g., categorical data) and a group of measures (e.g., numeric quantities). Some implementations also include a list of parameters.

The graphical user interface 110 also includes a data visualization region 414 for displaying a visual graphic (also referred to herein as a data visualization). In this example, the data visualization region displays a data visualization corresponding to data fields shown in the data information region 410. In some implementations, when no data source or data fields have been selected, the data visualization region 414 initially has no visual graphic (e.g., a data visualization is not displayed).

In some instances, the data visualization region 414 also includes a legend 416 and an interactive user affordance 418 for displaying and selecting a data visualization type. For example, FIG. 4A has a legend 416 that shows the color coding scheme of the data visualization shown in the data visualization region 414. In this example, the legend 416 shows that the blue and orange lines shown in the displayed data visualization region correspond to "men" and "women" respectively. Alternatively, as shown in FIG. 4B, a legend may be interactive and may be included in a portion of the graphical user interface 110 that is separate from the data visualization region 414. Additionally, the interactive user affordance 418 displays the type of data visualization ("line chart") currently being displayed. In some implementations, as shown, the interactive user affordance 418 is a drop down box that allows a user to specify the data visualization type to be displayed in the data visualization region 414.

In some implementations, the graphical user interface 110 also includes a natural language processing region 420. The natural language processing region 420 includes a natural language input box 112 for receiving natural language commands. A user may interact with the input bar to provide commands. For example, the user may type a command in the natural language input box 112 to provide the command. In addition, the user may indirectly interact with the natural language input box 112 by speaking into a microphone (e.g., an audio input device 220) to provide commands. In some implementations, an initial data visualization may be generated based on a user's selection of a data source and one or more data fields. After the initial data visualization is generated and displayed (in the data visualization region 414), the user may use natural language commands (e.g., in the natural language processing region 420) to further explore the displayed data visualization. For example, the user may provide a command to create a relationship between two data elements. In response to receiving the command, an updated data visualization that shows a correlation between the two data elements is generated and displayed in the data visualization region 414.

In some implementations, the natural language input box 112 is an editable field. For example, the natural language command received from a user has been transcribed into the natural language input box 112 ("number of gold medals by year and gender"). In some cases, the transcription may have resulted in an incorrectly transcribed word, for example, the word "gold" may have been incorrectly transcribed as "gone" or the user may have included an incorrect spelling or a typographical error in entering the natural language command. In such cases, the text displayed in the natural language input box 112 is editable to either correct mistakes such as incorrect transcriptions or typographical errors as well as to change the natural language command. For instance, the user may provide a natural language command, "color code gender by green and blue" and after seeing that the two colors are too similar to one another, the user may change the text to "color code gender by orange and blue." In response to this command, the visual specification and the data visualization are updated or modified to color code the genders by orange and blue.

In some implementations, as shown in FIG. 4B, the natural language processing region 420 also displays information regarding the currently displayed visualization. For example, in FIG. 4B, the natural language processing region 420 shows the natural language command input box 112 as well as information 413 (e.g., a phrase) ("Showing: how many males vs. females survived in first class?") regarding the data visualization that is currently displayed in the data visualization region 414. Additionally, the graphical user interface 110 also includes interactive filter controls 430. In this example, the interactive filter controls 430 are shown as interactive legends. In some implementations, the interactive filter controls 430 may be distinct from the legend. In this example, a first set of interactive filter controls 430-1 allows a user to select one or more fare classes (e.g., 1st class, 2nd class, and/or 3rd class) to be displayed in the data visualization. In this case, the 1st fare class is selected. Thus, the data visualization displays information corresponding to 1st class passengers and does not include information regarding passengers in the other (e.g., 2nd and 3rd) fare classes. A second set of interactive filter controls 430-2 allows the user to select which passengers to show: (i) all of the passengers, (ii) passengers who did not survive, or (iii) passengers who survived. The user has selected an option ("yes") that corresponds to passengers that survived. Thus, the data visualization displayed in the data visualization region 414 shows the number of passengers who had 1st class fares and survived the sinking of the Titanic. The data visualization is updated to reflect the user's selections in the interactive filter controls 430 or interactive legend. In some implementations, the data visualization is updated in real time as the user selects/deselects different options in the interactive filter controls 430 or interactive legend. For example, in response to receiving user selection of the 2nd class fare ("2") in the first set of interactive filters 430-1, an updated or modified data visualization that includes information regarding passengers who had 2nd class fares is displayed in the data visualization region 414 in place of the previously displayed data visualization.

In some implementations, if a user deselects all options from any of the first or second set of interactive filter controls, the data visualization may show no data or the data visualization region 414 may be empty.

Some implementations include a filter attribute as an encoded visual variable in the visual specification that specifies the filter conditions. For example, by adjusting the interactive filter controls, a user updates the filter visual variable. Some implementations anticipate future user needs by adding more information than requested. As a simple example, when asked "how many people in first class survived?", the system may respond with a histogram showing the number of people who survived in all class fares. The user may then deselect options corresponding to the 2nd and 3rd class fares and in response, the data visualization shown in FIG. 4B is displayed in the data visualization region.

Figure 4C:
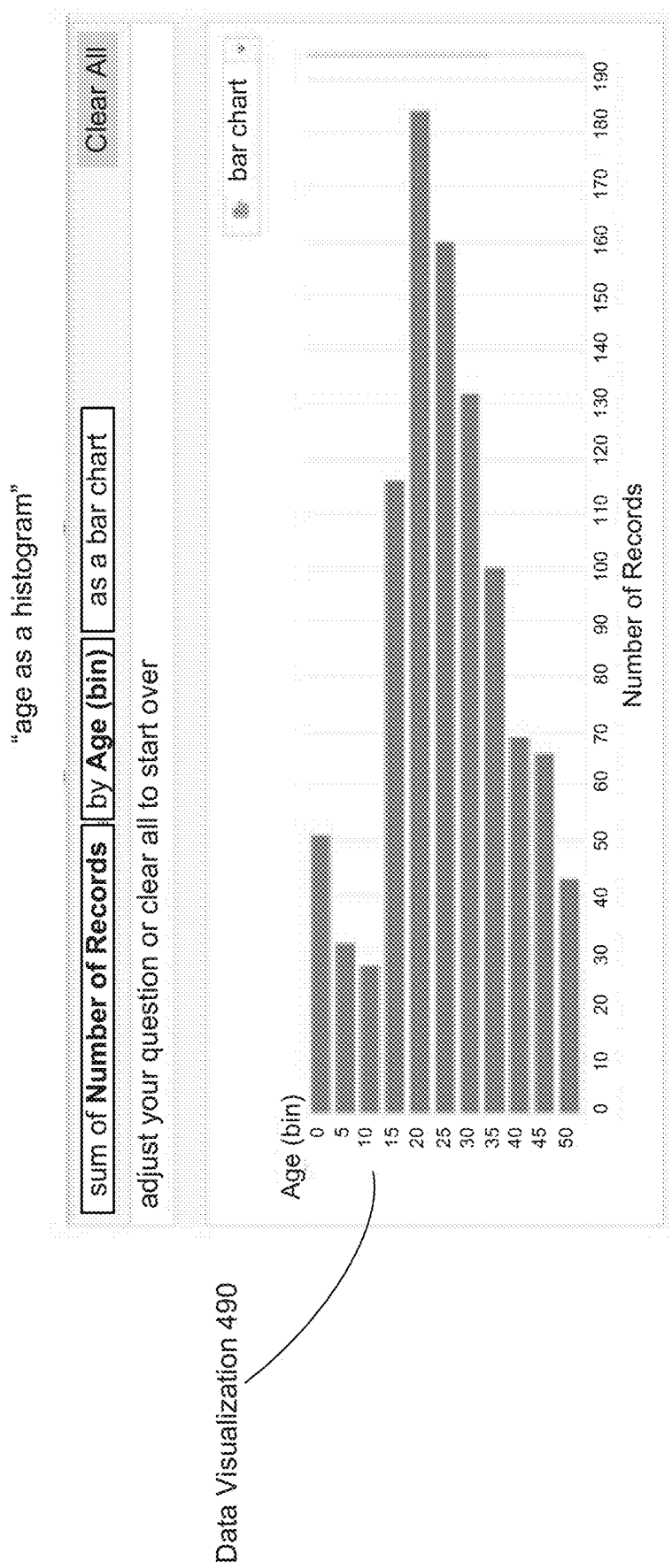
FIGS. 4C-4E provide examples of data visualizations according to some implementations.
Figure 4D:
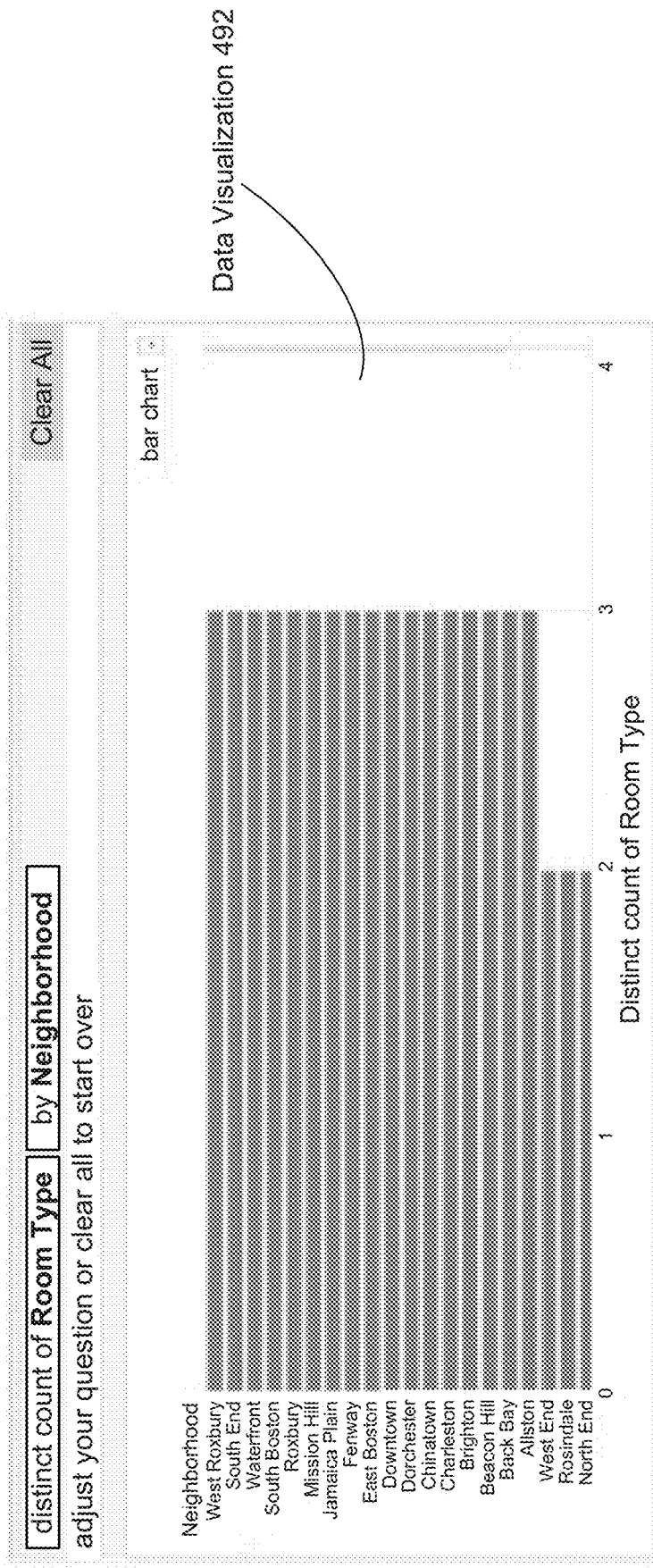
Figure 4E:
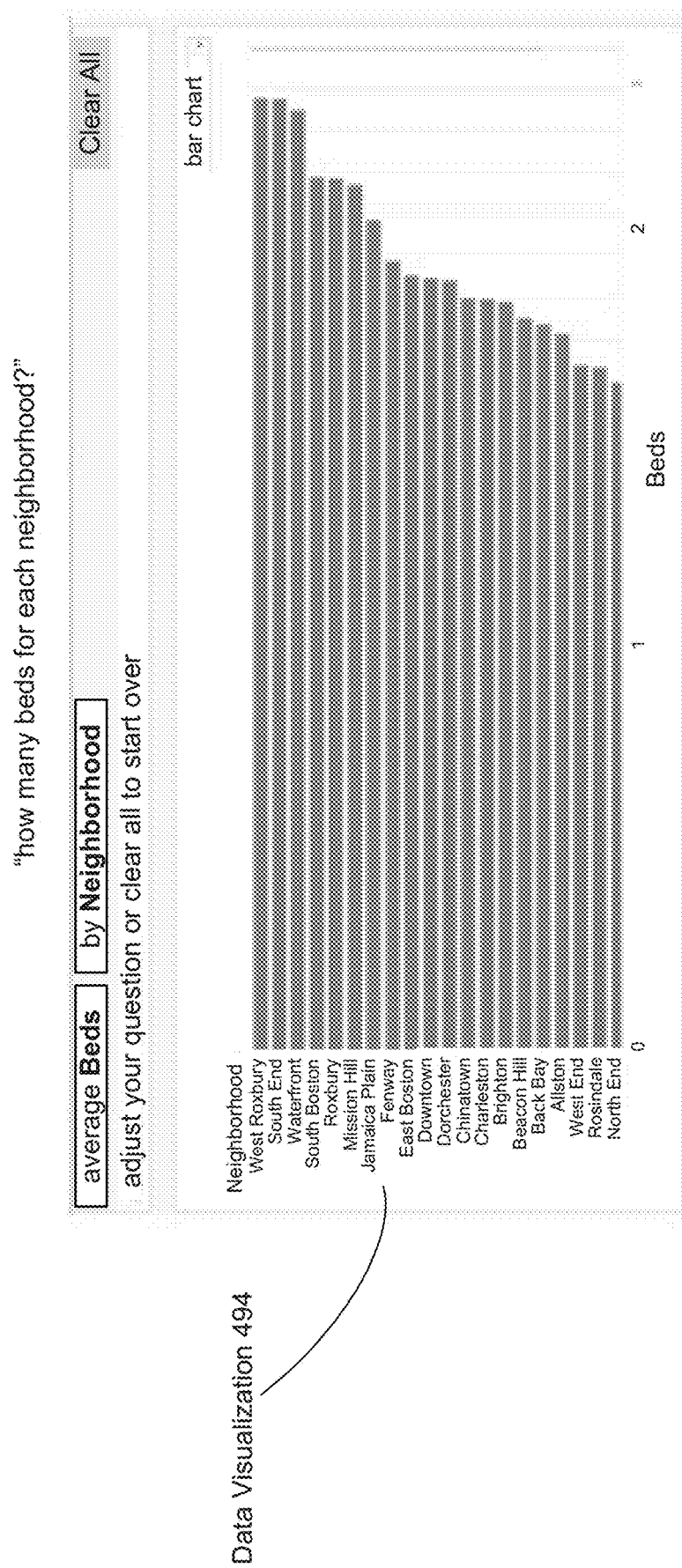
Figure 5A:
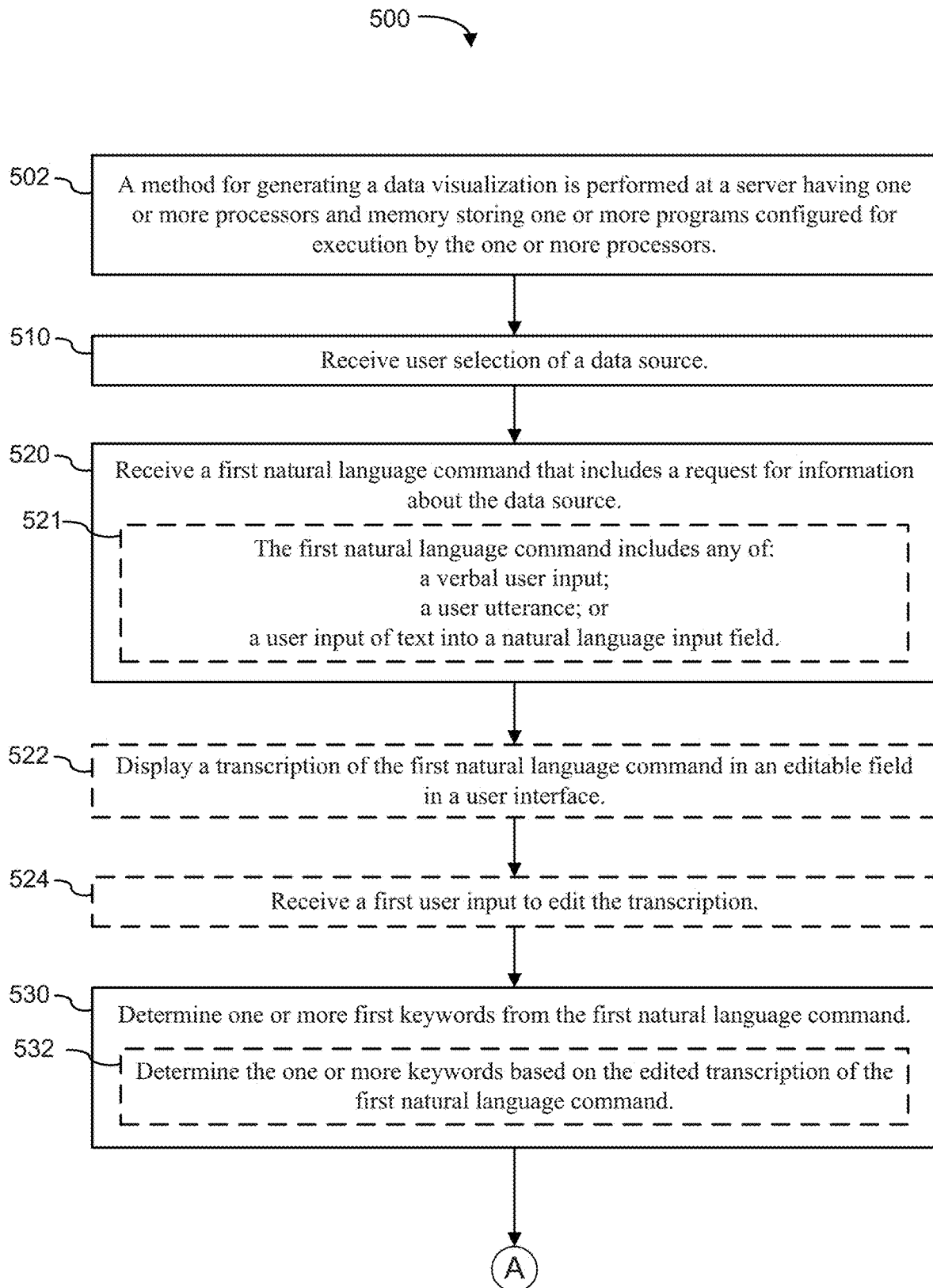
FIGS. 5A-5D provide a flow diagram of a method for generating data visualizations according to some implementations.
Figure 5B:
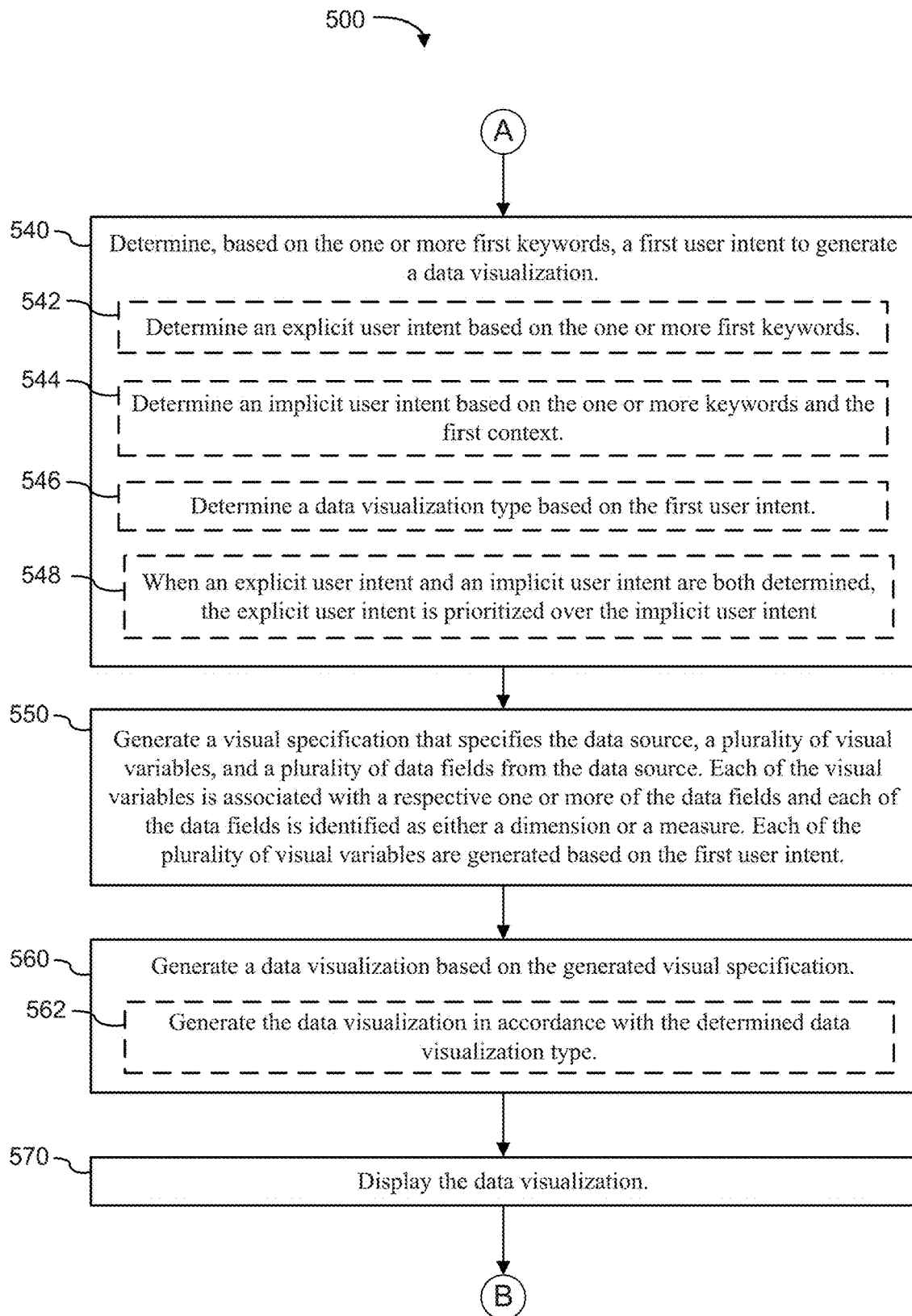
Figure 5C:
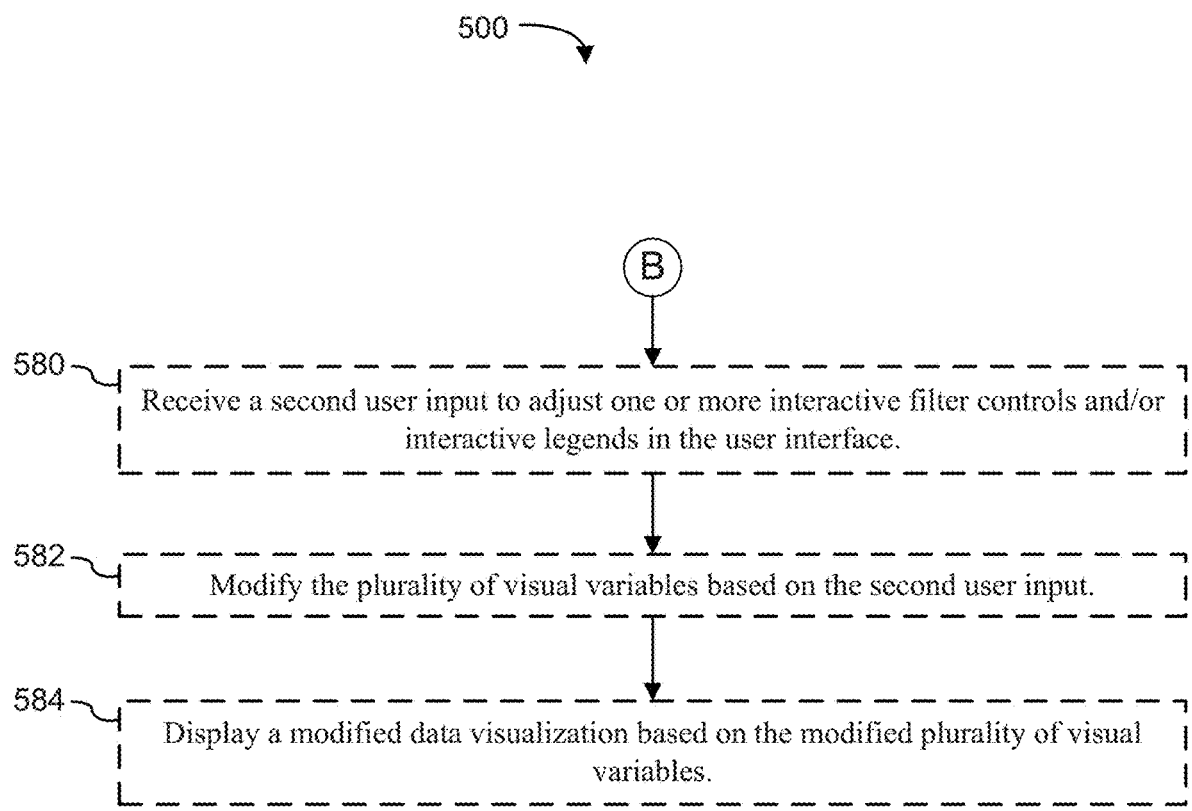
Figure 5D:
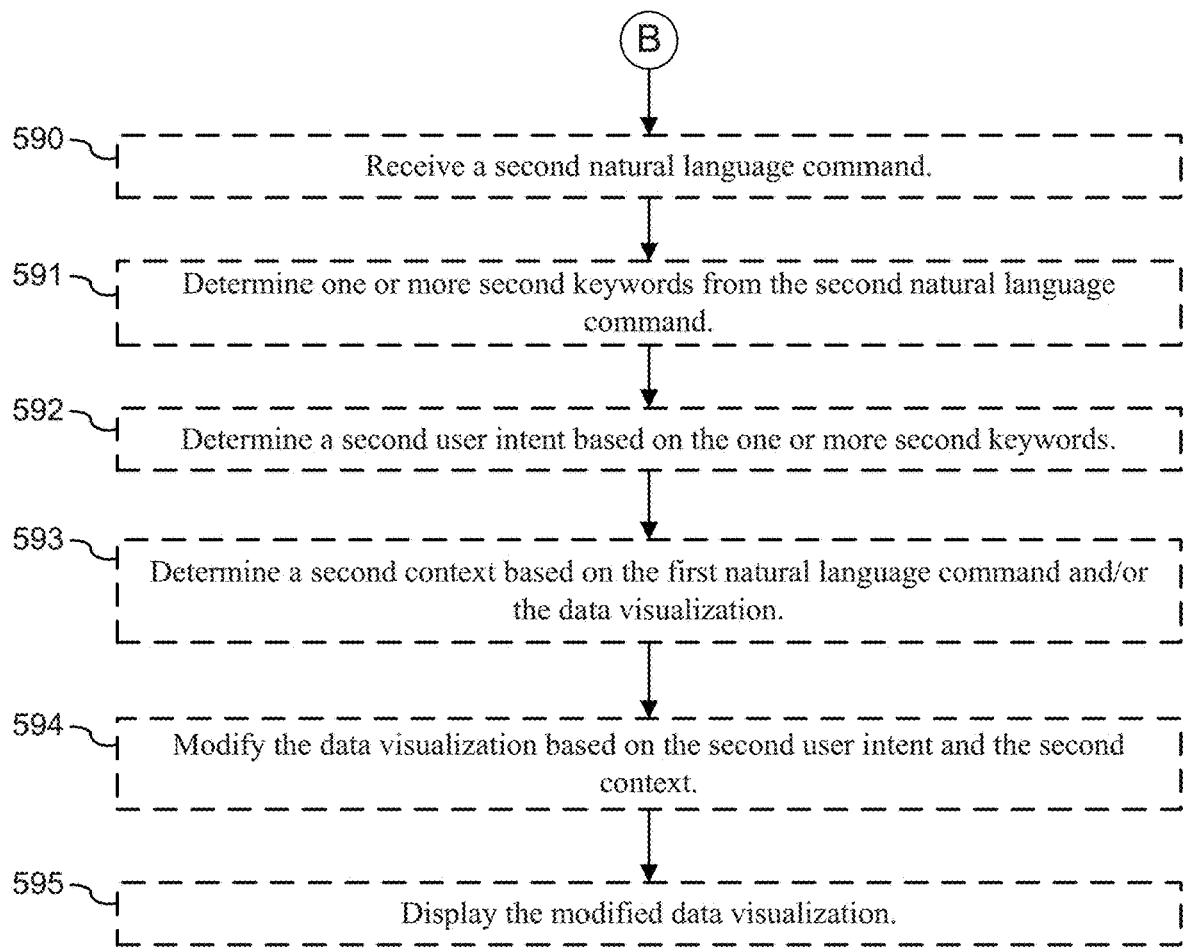
Figure 6A:
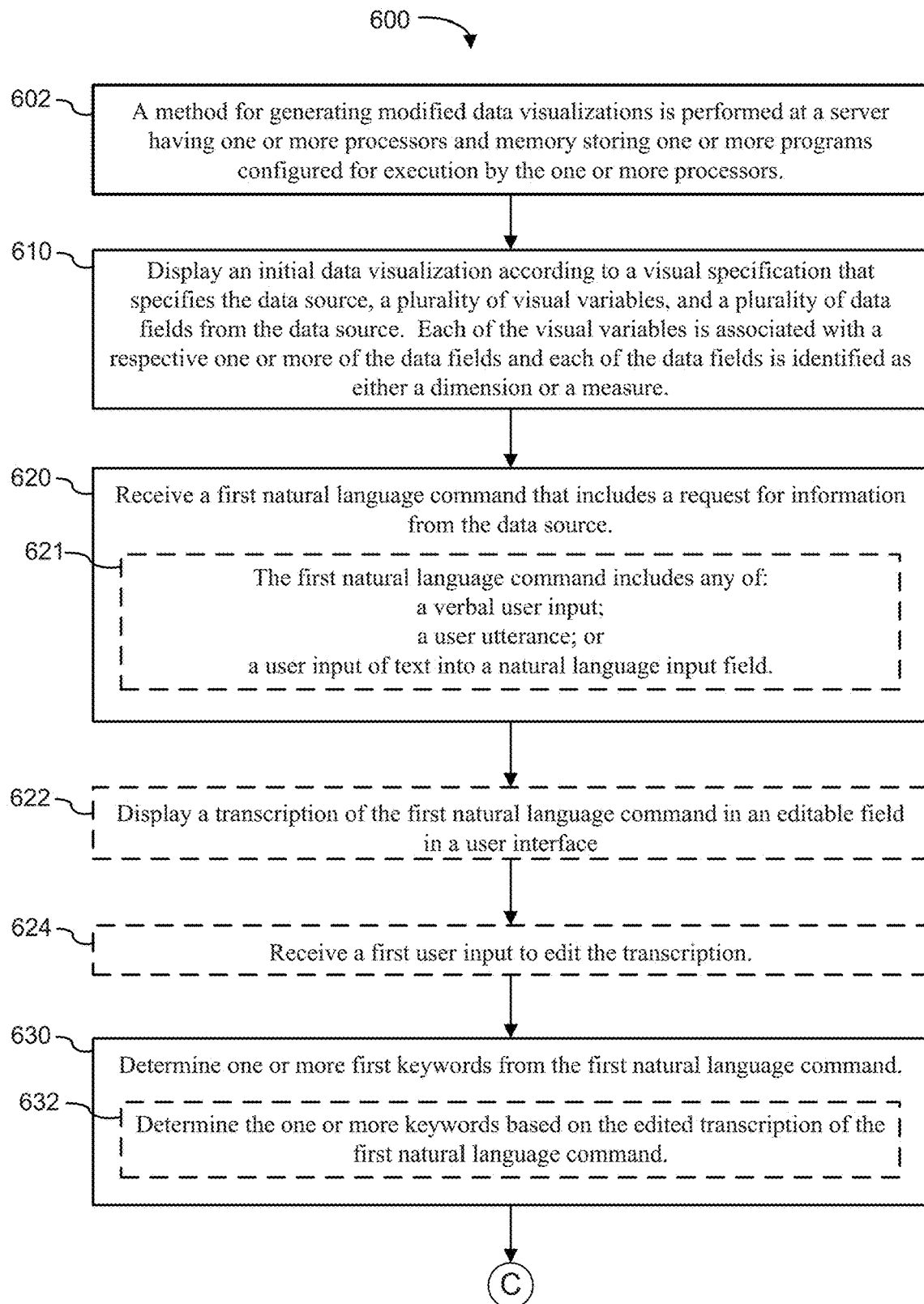
FIGS. 6A-6D provide a flow diagram of a method for modifying data visualizations according to some implementations.
Figure 6B:
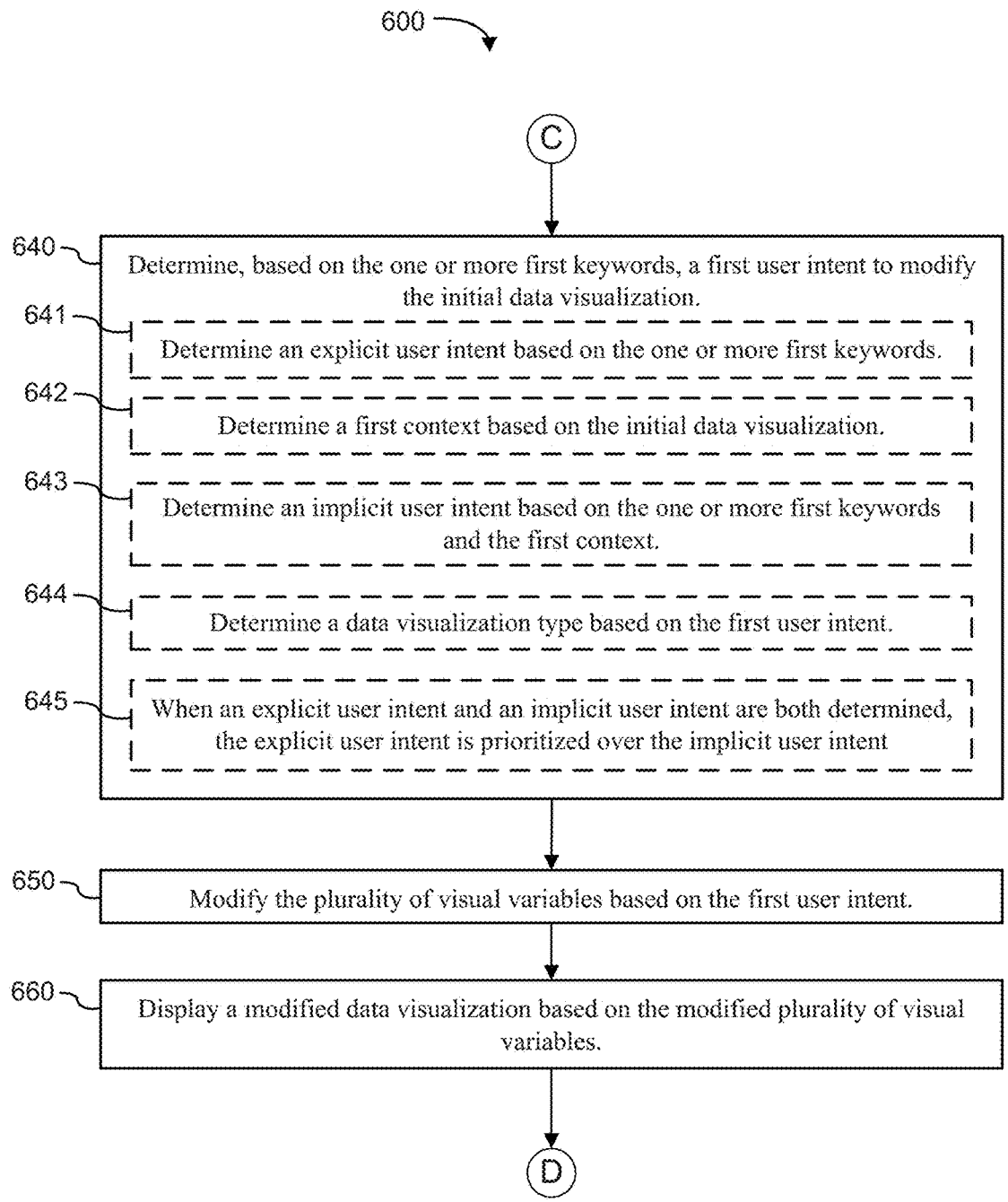
Figure 6C:
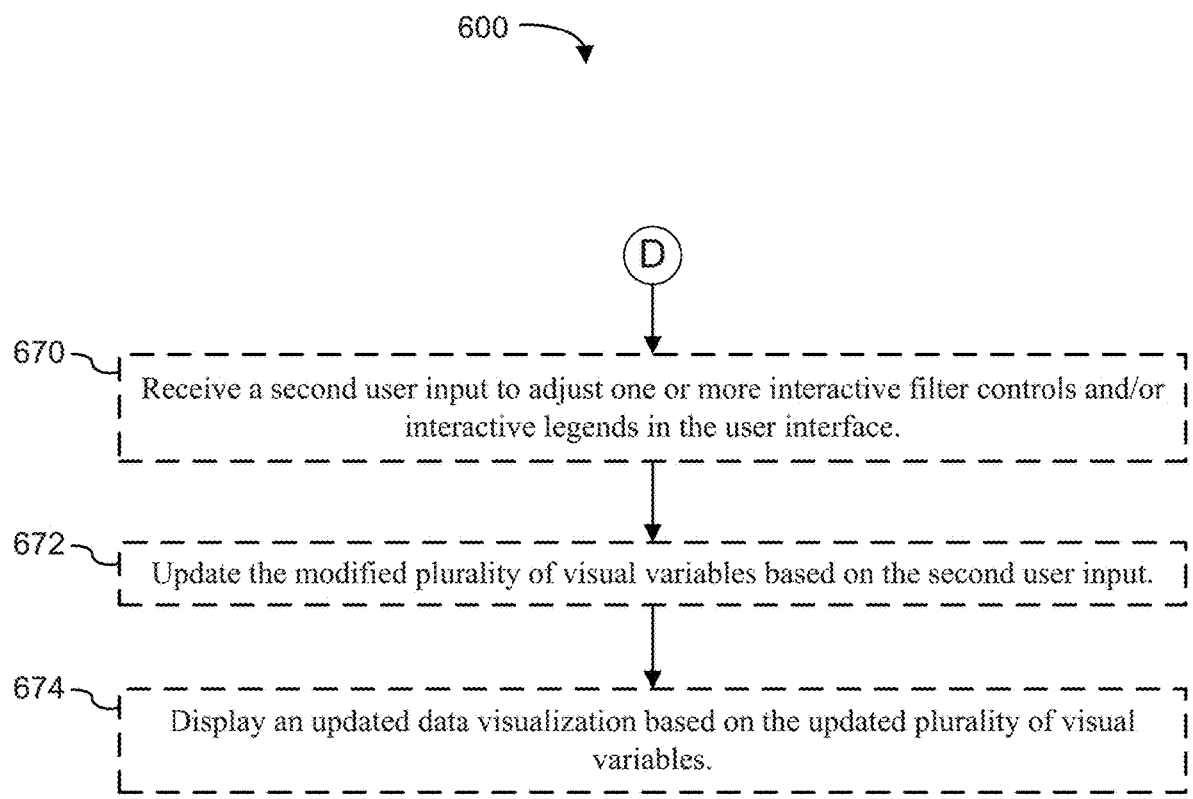
Figure 6D:
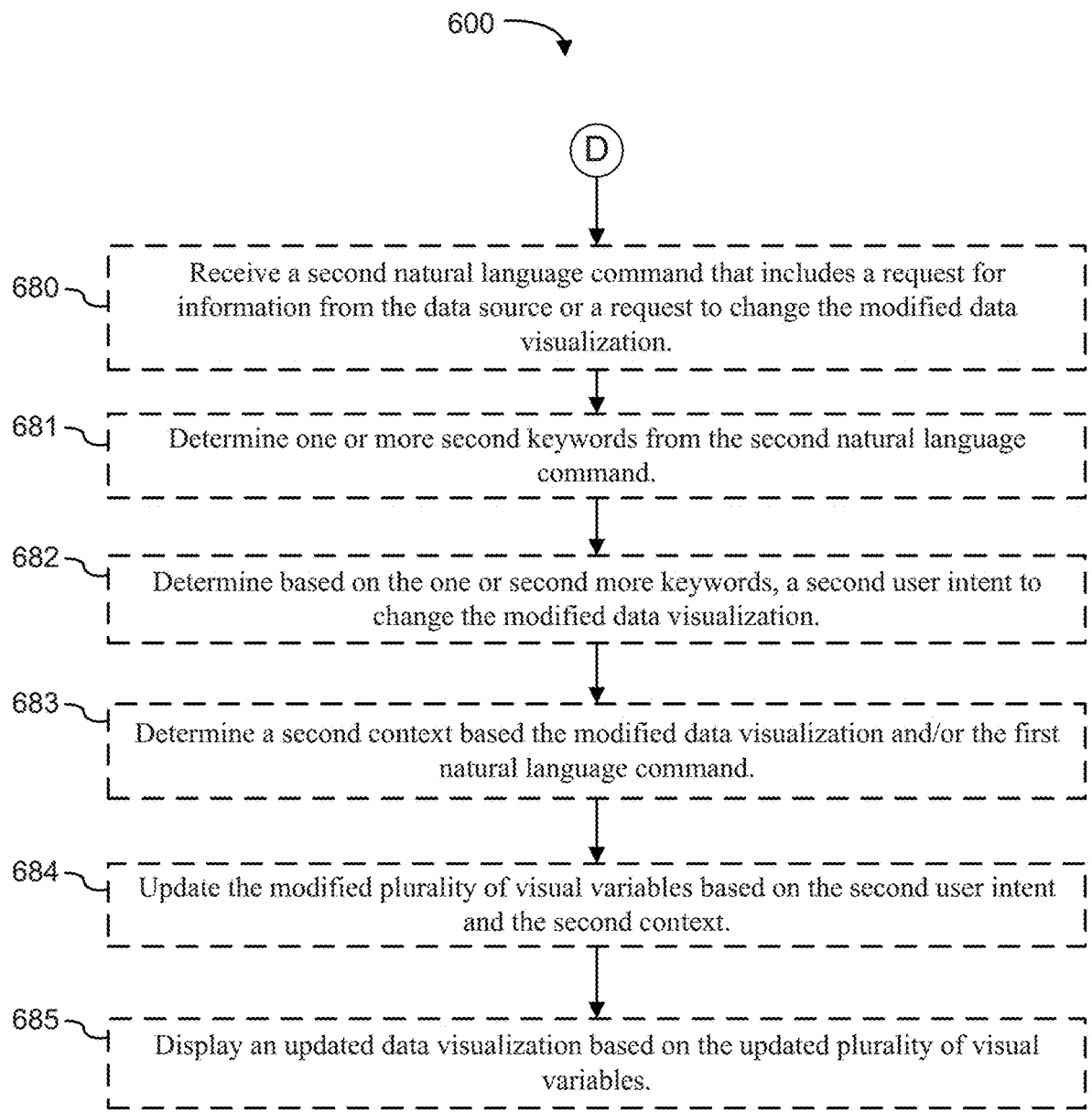

FIGS. 4C-4E provide examples of data visualizations in some implementations.

FIG. 4C illustrates a data visualization 490, which is a bar chart showing the number of passengers aboard the Titanic, separated by age. In some implementations, the data visualization 490 is generated and displayed in response to receiving a natural language command ("age as a histogram") from a user.

FIGS. 4D and 4E illustrate data visualizations 492 and 494, respectively, each of which displays information corresponding to a data source on apartment rentals. The data visualization 492, shown in FIG. 4D, is a histogram showing the number of apartment rental types in each neighborhood. In some implementations, the data visualization 492 is generated and displayed in response to receiving a first natural language command ("how many room types for each neighborhood") from a user. In response to receiving a second natural language command ("how many beds for each neighborhood") from the user, the data visualization region 414 is populated with a second data visualization 494, which is a histogram showing the average number of beds for the apartment rentals that are available in each neighborhood. In some implementations, the first data visualization 492 is replaced by the second data visualization 492 in the data visualization region 414.

FIGS. 5A-5D provide a flow diagram illustrating a method 500 of using natural language for generating (502) a data visualization according to some implementations. The steps of the method 500 may be performed by a computer 200. In some implementations, the computer includes one or more processors and memory. FIGS. 5A-5D correspond to instructions stored in a computer memory or computer-readable storage medium (e.g., the memory 206 of the computing device 200). The memory stores one or more programs configured for execution by the one or more processors. For example, the operations of the method 500 are performed, at least in part, by a data visualization generation module 234 and/or a language processing module 238.

In accordance with some implementations, the computer receives (510) user selection of a data source. For example, referring to FIG. 1, a user may select a data source 102 that includes a plurality of data fields. The computer also receives (520) user input that specifies a first natural language command. The first natural language command includes a request for information about the data source. For example, referring to FIG. 3A, the user may ask "how many children survived?" (or "show me children aboard who survived?") in relation to a data source that includes information regarding passengers aboard the Titanic. The first natural language command may include (521) any of: a verbal user input, a user utterance, or a user input of text into a natural language input field. For example, the user input may be received as text input (e.g., via a keyboard 216 or via a touch sensitive display 214) from a user in a data-entry region (such as the natural language input box 112 described with respect to FIGS. 4A and 4B) on the display in proximity to the displayed data visualization. In some instances, the user input is received as a voice command using a microphone 220 coupled to the computer. For example, in FIG. 3A, the natural language commands 302, 304, and 306 may be specified by voice commands.

The computer then determines (530) one or more first keywords from the first natural language command and based on the one or more first keywords, the computer determines (540) a first user intent to generate a data visualization. For example, referring to FIG. 3A, the second natural language command 304 received by the computer specifies "break this down by sex and age." In some implementations, the computer extracts "break," "this," "by sex and age" from the natural language command because these cue phrases relate to the displayed data visualization. When the phrases have direct reference to data fields in the displayed data visualization, the determination (e.g., extraction) of keywords is straight forward: collect all phrases that are direct references to data fields. In some implementations, the computer stems or removes stop words, filler words, or any predefined set of words from the incoming query, and extracts all other phrases from the natural language command because they may be related to the displayed data visualization. Some implementations use this approach when the phrases in the natural language command have some indirect reference to the data fields in the displayed visualization.

The computer (550) generates a visual specification that specifies the data source, a plurality of visual variables, and a plurality of data fields from the data source. Each of the visual variables is associated with a respective one or more of the data fields and each of the data fields is identified as either a dimension or a measure. Each of the plurality of visual variables is specified based on the first user intent.

The computer then (560) generates a data visualization based on the generated visual specification and (570) displays the data visualization. Following the example in FIG. 3A, the computer displays the first data visualization 312, based on the first natural language command 302. The first data visualization 312 is generated based on a visual specification that is built in accordance with the first user intent.

In some implementations, a transcription of the first natural language command is displayed (522) in an editable field in a user interface and the computer receives (524) a first user input to edit the transcription. In such cases, the one or more keywords are determined (532) based in the edited transcription of the first natural language command. For example, as shown in FIG. 4A, a transcription of a natural language command is displayed in the natural language input box 112. The natural language input box 112 is an editable field that allows the user to edit the text/transcription displayed. For example, the user may edit the text/transcription shown in the natural language input box 112 to correct transcription errors, spelling errors, or typographical errors.

In some implementations, the computer determines one or more of: an explicit user intent (542) based on the one or more first keywords, an implicit user intent (544) based on the one or more keywords, and a data visualization type (546) based on the first user intent. When an explicit user intent and an implicit user intent are both determined, the explicit user intent is prioritized (548) over the implicit user intent. In some implementations, the data visualization is generated (562) in accordance with the determined data type.

In some implementations, the computer (580) receives a second user input to adjust one or more interactive filter controls and/or interactive legends in the user interface, modifies (582) the plurality of visual variables based on the second user input, and displays (584) a modified data visualization based on the modified plurality of visual variables. For example, FIG. 4B shows interactive filters that are displayed as part of an interactive legend. As described above, the user may use the interactive filters to select/deselect which filters are applied to the data fields and therefore, what information is displayed in the data visualization.

In some implementations, the computer also receives (590) a second natural language command and determines: one or more second keywords (591) from the second natural language command, a second user intent (592) based on the one or more keywords, and a second context (593) based on the first natural language command and/or the data visualization that is currently displayed. The computer then modifies (594) the data visualization based on the second user intent and the second context and displays (595) the modified data visualization. For example, in FIG. 3A, the computer receives a second natural language command 304 and in response, generates and displays the second data visualization 314. Additional details are provided above with respect to FIG. 3A.

FIGS. 6A-6D provide a flow diagram illustrating a method of using natural language for modifying (602) data visualizations according to some implementations. The steps of the method 600 may be performed by a computer 200. In some implementations, the computer includes one or more processors and memory. FIGS. 6A-6D correspond to instructions stored in a computer memory or computer-readable storage medium (e.g., the memory 206 of the computing device 200). The memory stores one or more programs configured for execution by the one or more processors. For example, the operations of the method 600 are performed, at least in part, by a data visualization generation module 234 and/or a language processing module 238.

In accordance with some implementations, the computer displays (610) an initial data visualization according to a visual specification that specifies the data source, a plurality of visual variables, and a plurality of data fields from the data source. Each of the visual variables is associated with a respective one or more of the data fields and each of the data fields is identified as either a dimension or a measure. For example, FIG. 3B illustrates an initial data visualization 332 showing the number of survivors by fare. The computer receives (620) a user input that specifies a first natural language command. The first natural language command includes a request for information from the data source. For example, referring to FIG. 3B, the natural language command is "split this data by survived status." The first natural language command may include (621) any of: a verbal user input, a user utterance, or a user input of text into a natural language input field. For example, the user input may be received as text input (e.g., via a keyboard 216 or via a touch sensitive display 214) from a user in a data-entry region (such as the natural language input box 112 described with respect to FIGS. 4A and 4B) on the display in proximity to the displayed data visualization. In some instances, the user input is received as a voice command using a microphone 220 coupled to the computer. For example, in FIG. 3B, the natural language command 324 may be specified by a voice command.

The computer then determines (630) one or more first keywords from the first natural language command and based on the one or more first keywords, the computer determines (640) a first user intent to modify the initial data visualization. For example, referring to FIG. 3B, the natural language command 324 received by the computer specifies "split this data by survived status." In some implementations, the computer extracts "split," "this," "by survived status" from the natural language command because these cue phrases relate to the displayed data visualization. When the phrases have direct reference to data fields in the displayed data visualization, the determination (e.g., extraction) of keywords is straight forward: collect all phrases that are direct references to data fields. In some implementations, the computer stems or removes stop words, filler words, or any predefined set of words from the incoming query, and extracts all other phrases from the natural language command because they may be related to the displayed data visualization. Some implementations use this approach when the phrases in the natural language command have some indirect reference to the data fields in the displayed visualization.

The computer then modifies (650) the plurality of visual variables based on the first user intent and displays (660) a modified data visualization based on the modified plurality of visual variables. Following example 3B, the computer determines the user intent to split the data by the data field "survived?". Thus, the computer modifies the visual variables in the visual specification to include two graphs in the data visualization, one which shows information regarding passengers of the Titanic who survived ("yes") and a second graph that shows information regarding passengers of the Titanic who did not survive ("no").

In some implementations, a transcription of the first natural language command is displayed (622) in an editable field in a user interface and the computer receives (624) a first user input to edit the transcription. In such cases, the one or more keywords are determined (632) based in the edited transcription of the first natural language command. An example is provided with respect to FIG. 4A.

In some instances, the computer determines one or more of: an explicit user intent (641) based on the one or more first keywords, a first context (642) based on the initial data visualization, an implicit user intent (643) based on the one or more keywords, and a data visualization type (644) based on the first user intent. When an explicit user intent and an implicit user intent are both determined, the explicit user intent is prioritized (645) over the implicit user intent. In some implementations, the data visualization is generated (562) in accordance with the determined data type.

In some instances, the computer receives (670) a second user input to adjust one or more interactive filter controls and/or interactive legends in user interface, updates (672) the modified plurality of visual variables based on the second user input, and displays (674) an updated data visualization based on the updated plurality of visual variables. For example, FIG. 4B shows interactive filters that are displayed as part of an interactive legend. As described above, the user may use the interactive filters to select/deselect which filters are applied to the data fields and therefore, what information is displayed in the data visualization.

In some instances, the computer receives (680) a second natural language command and determines: one or more second keywords (681) from the second natural language command, a second user intent (682) based on the one or more keywords, and a second context (683) based on the first natural language command and/or the modified data visualization. The computer then updates (684) the modified data visualization based on the second user intent and the second context and displays (685) an updated data visualization based on the updated plurality of visual variables.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating modified data visualizations, comprising:
   at a computing device having one or more processors and memory storing one or more programs configured for execution by the one or more processors:
   displaying an initial data visualization according to an initial visual specification that specifies a data source, a plurality of visual variables, and a plurality of data fields from the data source, wherein:
      each of the visual variables defines a respective characteristic of data marks in the initial data visualization according to association of a respective one or more of the data fields with the respective visual variable, the respective characteristic specifying horizontal position, vertical position, color, size, or text, for the data marks; and
      the initial visual specification includes one or more previous natural language commands received from a user or properties specified by the user through natural language commands;
   receiving a first natural language command that includes a user request for information from the data source;
   in response to receiving the first natural language command:
      extracting one or more first keywords from the first natural language command;
      determining, based on the extracted one or more first keywords and one or more of (i) the data source, (ii) the visual variables, and/or (iii) the data fields of the initial visual specification, that the user request includes an intent request consisting of an explicit intent request or an implicit intent request, wherein the intent request is an implicit intent request when the extracted one or more keywords do not directly specify a characteristic in the visual specification;
      generating a modified visual specification in accordance with the determined intent request and the first natural language command;
      generating one or more queries based on the modified visual specification;
      executing the one or more queries to retrieve data for a modified data visualization; and
      generating and displaying the modified data visualization.

2. The method of claim 1, wherein the explicit intent request is prioritized over the implicit intent request.

3. The method of claim 1, further comprising:
   determining a data visualization type based on the first natural language command, wherein generating the modified data visualization is further in accordance with the determined data visualization type.

4. The method of claim 1, further comprising, in response to receiving the first natural language command:
   displaying a transcription of the first natural language command in an editable field in a user interface; and
   receiving user input to edit the transcription, wherein extracting the one or more first keywords from the first natural language command includes extracting the one or more first keywords based on the edited transcription of the first natural language command.

5. The method of claim 1, further comprising:
receiving user input to adjust one or more interactive filter controls or interactive legends in a user interface;
updating the modified visual specification based on the user input; and
displaying an updated modified data visualization based on the updated modified visual specification.

6. The method of claim 1, further comprising:
receiving a second natural language command that includes a request for information from the data source or a request to change the modified data visualization;
determining one or more second keywords from the second natural language command;
determining, based on the one or second more keywords, a second user intent to change the modified data visualization;
determining a second context based on the modified data visualization and/or the first natural language command;
updating the modified visual specification based on the second user intent and the second context; and
displaying an updated data visualization based on the updated modified visual specification.

7. The method of claim 1, wherein the first natural language command includes a verbal user input.

8. The method of claim 1, wherein the first natural language command includes a user utterance.

9. The method of claim 1, wherein the first natural language command includes a user input of text into a natural language input field.

10. The method of claim 1, wherein:
each of the data fields is identified as either a dimension or a measure; and
the initial data visualization is generated according to the identification of each of the data fields as a dimension or a measure.

11. The method of claim 1, further comprising:
determining that the intent request corresponds to an explicit intent request when the extracted one or more keywords directly specify a visual variable in the initial visual specification; and
generating the modified visual specification includes:
modifying the plurality of visual variables in the initial visual specification based on the extracted one or more keywords.

12. The method of claim 1, further comprising:
determining that the intent request corresponds to an implicit intent request; and
generating the modified visual specification includes:
identifying one or more first data fields from the natural language command; and
modifying the plurality of data fields in the initial visual specification to include the identified one or more first data fields.

13. A computing device, comprising:
one or more processors;
memory;
a display; and
one or more programs stored in the memory and configured for execution by the one or more processors, the one or more programs comprising instructions for:
displaying an initial data visualization according to an initial visual specification that specifies a data source, a plurality of visual variables, and a plurality of data fields from the data source, wherein:
each of the visual variables defines a respective characteristic of data marks in the initial data visualization according to association of a respective one or more of the data fields with the respective visual variable, the respective characteristic specifying horizontal position, vertical position, color, size, or text, for the data marks; and
the initial visual specification includes one or more previous natural language commands received from a user or properties specified by the user through natural language commands;
receiving a first natural language command that includes a user request for information from the data source;
in response to receiving the first natural language command:
extracting one or more first keywords from the first natural language command;
determining, based on the extracted one or more first keywords and one or more of (i) the data source, (ii) the visual variables, and/or (iii) the data fields of the initial visual specification, that the user request includes an intent request consisting of an explicit intent request or an implicit intent request, wherein the intent request is an implicit intent request when the extracted one or more keywords do not directly specify a characteristic in the visual specification;
generating a modified visual specification in accordance with the determined intent request and the first natural language command;
generating one or more queries based on the modified visual specification;
executing the one or more queries to retrieve data for a modified data visualization; and
generating and displaying the modified data visualization.

14. The computing device of claim 13, wherein the explicit intent request is prioritized over the implicit intent request.

15. The computing device of claim 13, wherein the one or more programs further comprise instructions for:
determining a data visualization type based on the first natural language command, wherein generating the modified the data visualization is further in accordance with the determined data visualization type.

16. The computing device of claim 13, wherein the one or more programs further comprise instructions for:
in response to receiving the first natural language command:
displaying a transcription of the first natural language command in an editable field in a user interface; and
receiving user input to edit the transcription, wherein extracting the one or more first keywords from the first natural language command includes extracting the one or more first keywords based on the edited transcription of the first natural language command.

17. The computing device of claim 13, wherein the one or more programs further comprise instructions for:
receiving user input to adjust one or more interactive filter controls or interactive legends in a user interface;
updating the modified visual specification based on the user input; and
displaying an updated modified data visualization based on the updated visual specification.

18. The computing device of claim 13, wherein the one or more programs further comprise instructions for:
- receiving a second natural language command that includes a request for information from the data source or a request to change the modified data visualization;
- determining one or more second keywords from the second natural language command;
- determining, based on the one or second more keywords, a second user intent to change the modified data visualization;
- determining a second context based on the modified data visualization and/or the first natural language command;
- updating the modified visual specification based on the second user intent and the second context; and
- displaying a second modified data visualization based on the updated modified visual specification.

19. The computing device of claim 13, wherein the first natural language command includes either a verbal user input or a user utterance.

20. A non-transitory computer readable storage medium storing one or more programs configured for execution by a computing device having one or more processors, memory, and a display, the one or more programs comprising instructions for:
- displaying an initial data visualization according to an initial visual specification that specifies a data source, a plurality of visual variables, and a plurality of data fields from the data source, wherein:
  - each of the visual variables defines a respective characteristic of data marks in the initial data visualization according to association of a respective one or more of the data fields with the respective visual variable, the respective characteristic specifying horizontal position, vertical position, color, size, or text, for the data marks; and
  - the initial visual specification includes one or more previous natural language commands received from a user or properties specified by the user through natural language commands;
- receiving a first natural language command that includes a user request for information from the data source;
- in response to receiving the first natural language command:
  - extracting one or more first keywords from the first natural language command;
  - determining, based on the extracted one or more first keywords and one or more of (i) the data source, (ii) the visual variables, and/or (iii) the data fields of the initial visual specification, that the user request includes an intent request consisting of an explicit intent request or an implicit intent request, wherein the intent request is an implicit intent request when the extracted one or more keywords do not directly specify a characteristic in the visual specification;
  - generating a modified visual specification in accordance with the determined intent request and the first natural language command;
  - generating one or more queries based on the modified visual specification;
  - executing the one or more queries to retrieve data for a modified data visualization; and
  - generating and displaying the modified data visualization.

* * * * *